United States Patent [19]

Okamoto

[11] Patent Number: 4,703,681

[45] Date of Patent: Nov. 3, 1987

[54] KEY DEPRESSION INDICATING DEVICE FOR ELECTRONIC MUSICAL INSTRUMENT

[75] Inventor: Eisaku Okamoto, Hamamatsu, Japan

[73] Assignee: Nippon Gakki Seizo Kabushiki Kaisha, Hamamatsu, Japan

[21] Appl. No.: 824,135

[22] Filed: Jan. 30, 1986

[30] Foreign Application Priority Data

Jan. 31, 1985 [JP] Japan ................................ 60-16927

[51] Int. Cl.4 ................................................ G09B 15/02

[52] U.S. Cl. ......................................... 84/478; 84/484; 84/DIG. 12

[58] Field of Search ................. 84/478, 479 R, 479 A, 84/482, 484, DIG. 12, 1.03

[56] References Cited

U.S. PATENT DOCUMENTS 4,378,720 4/1983 Nakada et al. .................... 84/478 X
4,651,612 3/1987 Matsumoto .......................... 84/1.03

*Primary Examiner*—S. J. Witkowski

*Attorney, Agent, or Firm*—Spensley Horn Jubas & Lubitz

[57] ABSTRACT

In a key depression indicating device for an electronic musical instrument capable of visually indicating which keys are to be depressed on a keyboard, the device includes a plurality of indicators provided correspondingly to a plurality of keys of the keyboard. Illumination of each indicators is so controlled by an illumination control means that an indicator corresponding to a succeeding note is lighted up at a timing, for example, a 4-th note's length ahead of the timing to depress the key irrespective of any length of the preceding note. Thus, even when a complicated music performance including a train of a plurality of consecutive short notes as a 32nd note is required, the indicators corresponding to the preceding as well as the succeeding notes in the train are each lighted up at a timing, i.e. the 4-th note's time length ahead of each actual key depression timing for the music performance. In this way, since there is given a sufficient ready time for each note, the player of the instrument is able to perform a smooth key depressing operation in accordance with the key-depressing indications given by the device.

9 Claims, 17 Drawing Figures

KEY DEPRESSION INDICATING DEVICE FOR ELECTRONIC MUSICAL INSTRUMENT

BACKGROUND OF THE INVENTION (a) Field of the Invention

The present invention relates to a key depression indicating device for an electronic musical instrument, and more particularly it pertains to a key depression indicating device for a keyboard type electronic musical instrument having a plurality of keys and tone-producing channels, which device having a plurality of key depression indicators corresponding respectively to said keys and being selectively lighted up in accordance with the note data read out from memory means sequentially, whereby to indicate keys requiring successive depressions with the progression of a music piece so that a trainee may effect a musical performance by following the key depression indications.

(b) Description of the Prior Art

In the field of monophonic electronic musical instruments, there has been known the art which is designed to indicate those keys requiring to be depressed one after another as the indicators are lighted up successively in accordance with the note data read out from memory means which are provided in the instrument (see, for example, U.S. Pat. No. 4,378,720). In this prior art, arrangement is provided so that, under the condition that the key corresponding to a given note has been depressed actually, an indicator corresponding to the next note is lighted up.

In a polyphonic electronic musical instrument also, there has been known the technique which is similar to that of the above-mentioned monophonic electronic musical instrument and which is designed to be operative so that, under the condition that a plurality of keys corresponding to a given chord, e.g. C-E-G, have been actually depressed simultaneously, a plurality of key depression indicators corresponding to the next chord are lighted up simultaneously, whereby indicating the chord keys which are to be depressed next (see for example, Japanese Patent Preliminary Publication No. Sho 59-90894).

According to the above-mentioned prior art, there are the following inconvenience such that, while in case the note of the depressed key is a relatively long one such as a half-note, the illumination by the key depression indicator corresponding to the next note commences a certain period (for example, a time length corresponding to a fourth note) ahead of the arrival of the timing for the depression of said next key, and that this indicator is kept illuminating till the arrival of the timing for the depression of said next key; in case, however, the note of the depressed key is a relatively short one such as a 32nd note, the indicator corresponding to the next note is lighted up only for a short period corresponding to the duration of the short note of the key depressed just now. For this reason, in case there occurs a train of a plurality of consecutive short notes, no sufficient key-depression indicating time is available, giving rise to the problem of hampering a smooth key depressing operation.

SUMMARY OF THE INVENTION

It is, therefore, a primary object of the present invention to provide a key depression indicating device for a keyboard type electronic musical instrument capable of indicating keys to be depressed for a trainee's smooth operation.

Another object of the present invention is to provide a key depression indicating device which can give a trainee key depression indications sufficiently before the time for making an exact depression of proper keys.

Still another object of the invention is to provide a key depression indicating device which is capable of indicating the depression timing of even a plurality of successive short notes wherein a plurality of relevant indicating means are lighted up in parallel fashion.

A further object of the invention is to provide a key depression indicating device which can control lighting conditions in response to the detection of depression of keys or no key.

A still further object of the invention is to provide a key depression indicating device which can control the rate of indication in response to improperly delayed or quickened depression by the trainee.

A yet further object of the invention is to provide a key depression indicating device which can produce clear indications, without confusion of key depression indication, even when the notes of a same tone pitch are successively indicated.

Another object of the invention is to provide a key depression indicating device which can count the time up to the subsequent key depression timing from the time of the quickened depression of a previously dre-pressed key.

In accordance with one aspect of the present invention, the key depression indicating device for an electronic musical instrument having a plurality of tone-producing channels for producing musical tones responsive to key operation on a keyboard of said instrument, comprises:

(a) a plurality of indicators provided correspondingly to a plurality of keys of said keyboard;

(b) memory means storing note data representing a plurality of notes requiring to be sounded out in succession to constitute a music performance and assigned appropriately to said plurality of tone-producing channels;

(c) means for generating a tempo clock signal;

(d) means for defining timewise progression of said music performance with respect to said tempo clock signal;

(e) reading-out means for reading out, from said memory means, note data at a reading-out pace determined according to said timewise progression, the reading-out action being effected, for each of the respective tone-producing channels, at a predetermined length of time ahead, in light of said timewise progression, of the timing of key depression for the note assigned to said each tone-producing channel; and (f) illumination control means for controlling, each time the note data is read out from said memory means, the illumination of an indicator, among the plurality of indicators, corresponding to a key of the note represented by the read-out note data.

According to another aspect of this invention, the device may further comprise detecting means for detecting, from among said plurality of keys, a fact of key depression with respect to the key corresponding to the illuminating indicator; and indication control means for controlling a state of indication of the illuminating indicator in accordance with a result of detection done by said detecting means.

The indication control means functions so that, upon detection by said detecting means of a key or keys having been depressed, it extinguishes the illuminating indicator or indicators corresponding to such key or keys. Also, the indication control means may further function to render, when said detecting means has detected a fact of no key depression with respect to a key requiring to have been depressed earlier, that specific indicator corresponding to said key having the fact of no key depression to a state of illumination different in style from that of other illuminating indicators.

In still another aspect of the present invention, the key depression indicating device may further comprise judging means for judging, based on said tempo clock signal, as to the arrival or no arrival of time for a key depression for each of said tone-producing channels; and control means to be operative, under the condition that an indicator is illuminating with respect to the tone-producing channel having been judged by said judging means as having arrived at a key-depressing timing, to render the illuminating indicator to a state of illumination different in style from that of illumination it has till then been presenting, and along therewith to interrupt the generation of said tempo clock signal.

In a yet another aspect of the invention, the device further comprises reading out control means operative to quicken the pace of said timewise progression under the condition that when said detecting means has detected a fact of key depression with respect to the tone-producing channels having been judged by said judging means as having not yet arrived at a key-depressing timing, those indicators corresponding to keys for all respective tone-producing channels are put out. The reading-out timing control means is operative to return, when said reading-out means reads out a next note data at a quickened pace, this quickened pace of said timewise progression back to the pace determined by said tempo clock signal. Also, the reading-out timing control means is operative to return, at an arrival of a next key-depressing timing, said quickened pace of said timewise progression back to the pace determined by said tempo clock signal.

The key depression indicating device according to the present invention can eliminate all of the above-described problems encountered in the prior techniques, and also can function in such a way that, in case short notes appear in a consecutive fashion, key depression indicators corresponding to the respective short notes are lighted up in parallel so that every key to be depressed is indicated for a sufficient length of time for the trainee.

More particularly, the present invention provides an arrangement wherein note data corresponding to a plurality of notes which are to be sounded out in succession are stored as they are assigned appropriately to a plurality of tone-producing channels, and that, under the condition that the time which is a predetermined time length ahead of the timing requiring key depression for each tone-producing channel has arrived, said data are read out to light up those indicators corresponding to the tone pitches of the notes thus read out, whereby to allow the user to perform a smooth key depression even when short notes are arrayed consecutively on a music score.

Still more particularly, according to the present invention, the key depression indicating device for an electronic musical instrument having a plurality of tone-producing channels which are responsive to key depression on the keyboard is constructed with a number of indicators, memory means, tempo clock generating means, reading-out means and lighting control means.

The above-said plurality of indicators are provided so as to correspond respectively to a plurality of keys on the keyboard, and they are arranged on their respective keys or in the vicinity of their corresponding keys.

The above-said memory means stores note data corresponding respectively to a plurality of notes which are to be sounded out consecutively, in such a manner that these data are assigned appropriately to a plurality of tone-producing channels for generation of tones of the respective notes.

The above-said tempo clock generating means is intended to generate tempo clock signals which, in turn, are supplied to the reading-out means.

The above-said reading-out means detects the arrival of the respective times each of which is a certain time length ahead of the timing at which the key for the note of each channel to which it has been assigned is to be depressed based on a given tempo clock signal, and reads out the note data corresponding to the respective notes. The note data thus read out are supplied to the lighting control means.

The above-said lighting control means is intended to control the illumination of those key depression indicators, among the plurality of indicators, which correspond respectively to those note pitches indicated by the read-out note data every time a note data is read out from the memory means.

According to the above-mentioned construction of the device of the present invention, if the above-described certain time length is set so as to correspond to the length of, for example, a 4-th note, an indicator corresponding to a succeeding note is lighted up at a timing which is the 4-th note's length ahead of the timing at which the key for the succeeding note is to be depressed, irrespective of any length of the preceding note. Thus, in case there occurs a train of a plurality of consecutive 32nd notes, those key depression indicators corresponding to the preceding as well as the suceeding notes in the train are each lighted up at a timing which is a 4-th note's time length ahead of each actual key depression timing. As such, the player of the instrument is able to perform a smooth key-operation in accordance with the key-depressing indications which are given by the device.

The above-mentioned object as well as other objects of the present invention will become apparent during the course of the following detailed description and appended claims.

BRIEF DESCRIPTION OF THE INVENTION

FIG. 1 a block diagram showing the circuit arrangement of the electronic musical instrument according to an embodiment of the present invention.

DETAILED DESCRIPTION OF THE PREFERRED EMBODIMENT

The present invention will hereunder be described in further detail with respect to an embodiment of the present invention when taken in connection with the exemplary drawings.

Figure 1:
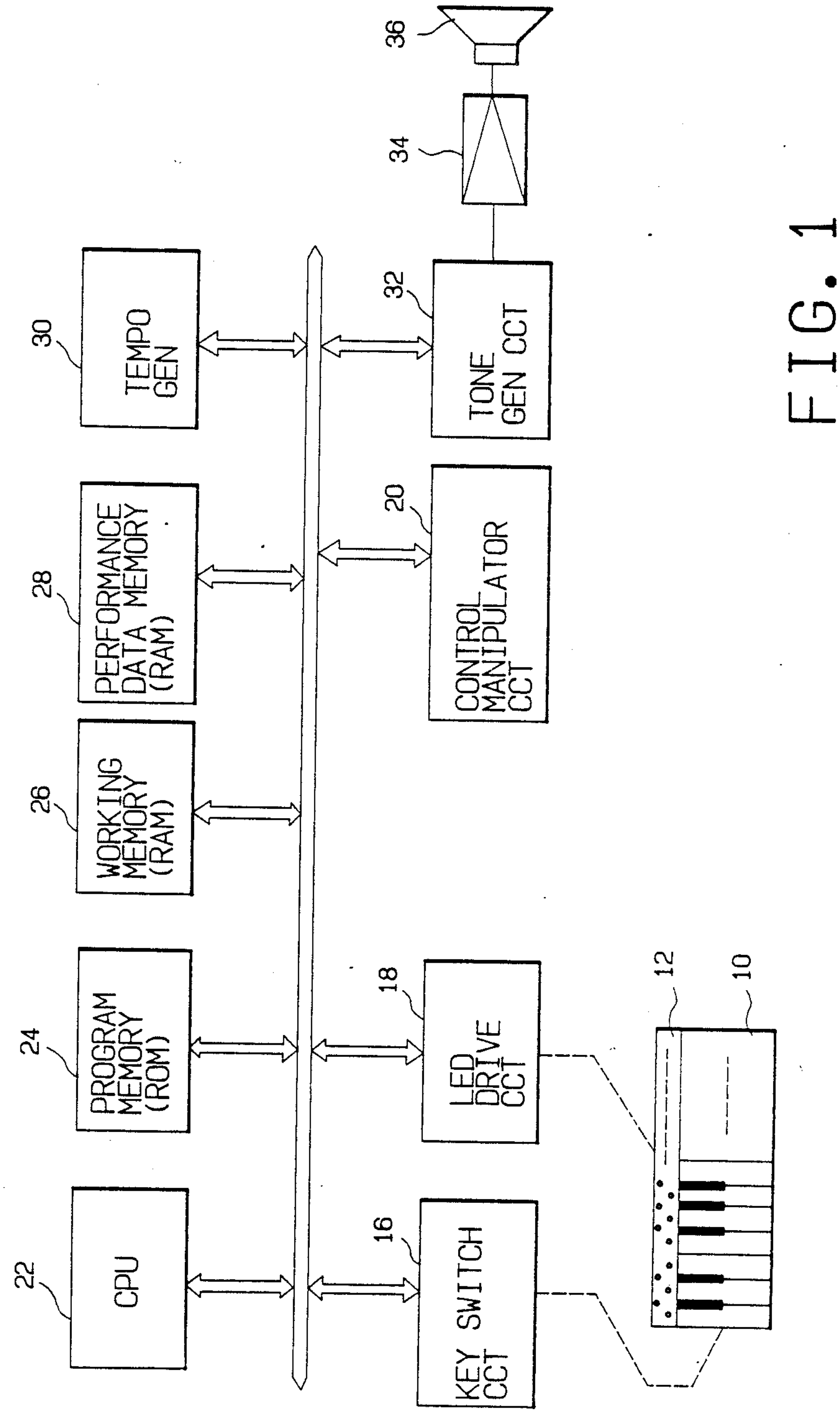

Circuit arrangement (FIG. 1)

FIG. 1 shows a circuit arrangement of the electronic musical instrument according to an embodiment of the present invention. This electronic musical instrument is designed to perform indication of keys to be depressed, generation of tones according to manual performance, and generation of tones in automatic music performance.

A keyboard 10 has a plurality of keys. In the vicinity of this keyboard 10 is provided a group of LEDs (Light-Emitting Diodes) 12. The group of LEDs 12 includes a plurality of LEDs which are provided to correspond respectively to the plurality of keys of the keyboard 10. In this embodiment, LEDs are employed as the indicators for indicating keys to be depressed. These LEDs may be replaced by lamps or like signaling means. Also, the key-depression indicators may be disposed upon or within the respective keys, instead of being positioned in the vicinity of respective keys.

To a bus 14 are connected a key switch circuit 16, an LED drive circuit 18, a control manipulator circuit 20, a central processing unit (CPU) 22, a program memory 24, a working memory 26, a performance data memory 28, a tempo clock generator 30, and a tone generating circuit 32.

The key switch circuit 16 includes a plurality of key switches which are actuated by a plurality of keys, respectively, of the keyboard 10. This circuit is designed so that instantaneous state of the key operation can be detected by successively and repetitively scanning these key switches.

The LED drive circuit 18 is intended to make selective drive control of the plurality of LEDs provided among the group of LEDs 12 in response to the indication control informations (data signals) which are supplied thereto via the bus 14.

The control manipulator circuit 20 includes control manipulating members or knobs of a mode changeover switch, a start/stop control switch, tone color selection switches, tone volume setting switches and like switches. This circuit is arranged to detect the control state complying to the operation of these control manipulating members.

The CPU 22 is intended to carry out various kinds of processing for the purposes of indicating keys requiring depression and of generating tones in accordance with the program stored in the program memory 24 which is comprised of a ROM (Read-Only Memory). The details of these processing operations will be described later by referring to FIGS. 5 through 17.

The working memory 26 is comprised of a RAM (Random Access Memory), and includes portions functioning as registers, counters, pointers, flags and so forth which are utilized by CPU for carrying out various kinds of processing. The details of these various kinds of functional portions will be described later.

The performance data memory 28 is comprised of a RAM storing the performance data of a desired music piece. The performance data format will be described later by giving reference to FIGS. 3 and 4.

The tempo clock generator 30 is intended to generate a tempo clock signal at a period corresponding to the 96-th note for the purpose of starting the interrupt routine which will be described later.

The tone generating circuit 32 has, for example, four tone-producing channels. Each channel is arranged to generate a tone signal in response to the key operation on the keyboard 10 or to the data read out from the performance data memory 28. The tone signal generated from each tone-producing channel is supplied, via an output amplifier 34, to a loudspeaker 26, to be converted to a sound. In this instant embodiment, four tone-producing channels are provided, so that up to four tones can be sounded at the same time.

The above-described electronic musical instrument is so constructed as to be operative in a guide mode and also in a reproduction mode. In case of the guide mode operation, indication of key depression is performed by appropriately driving the group of LEDs 12 based on the data read out from the performance data memory 28, and in addition it is possible to generate manual performance tones in compliance to the key operation on the keyboard 10 using the four tone-producing channels. Also, in case of the reproduction mode operation, an automatic performance is realized by an appropriate drive of the four tone-producing channels based on the data read out from the performance data memory 28, and along therewith indication of key depression corresponding to the contents of an automatic performance is available by an appropriate drive of the group of LEDs 12 based on the data read out from the performance data memory 28.

Figure 2:
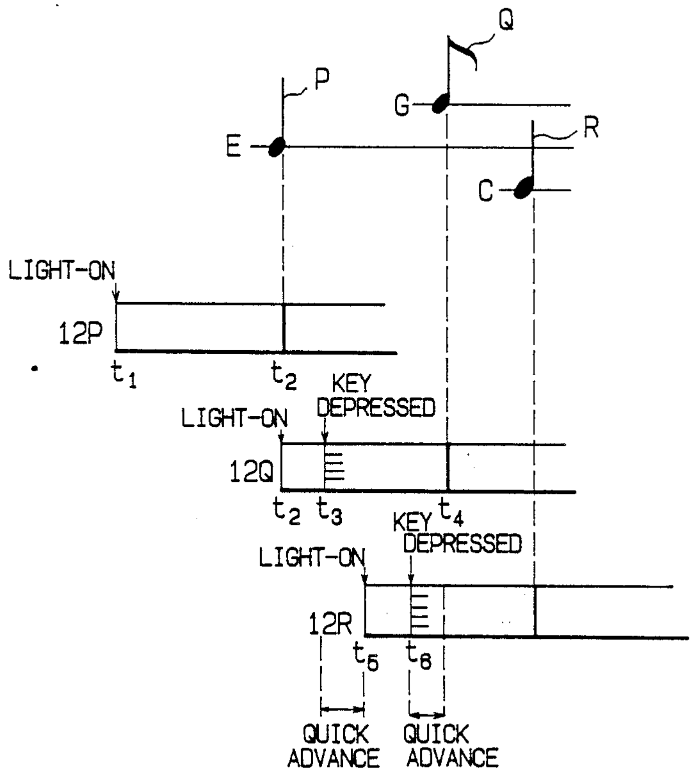
FIG. 2 is a time chart for explaining the key depression indicating operation in the guide mode.

Outline of key-depression indicating operation in guide mode (FIG. 2)

An outline of key depression indicating operation in the guide mode will hereunder be made by referring to FIG. 2. As an example, in case a plurality of notes P, Q, R (their pitches are hereby designated as E, G, C) which are to be sounded out in succession are given, it should be understood that upon the arrival of the time $t_1$ which is a certain length of period (the duration of a 4-th note in this example) ahead of the timing $t_2$ at which a key for the 4-th note is to be depressed, the LED 12P corresponding to the note P is lighted up. And, unless the key corresponding to the note P is depressed actually by the timing $t_2$, the device is rendered to the state of "wait", and the LED 12P corresponding to the note P is switched from its illuminating state (continuous "on") to the flashing state (alternating "on" and "off").

On the other hand, when a key corresponding to the note P is depressed at timing t2, the LED 12P corresponding to the note P is put out in accordance with the depression of the key, and along therewith the LED 12Q corresponding to the next 8-th note Q is lighted up due to the arrival of time which is a 4-th note's length ahead of the timing $t_4$ at which the next key for the 8-th note Q is to be depressed. And, when the key corresponding to the note Q is depressed at timing $t_3$ prior to timing $t_4$, the LED 12Q corresponding to the note Q is put out as a result of this key depression, and along therewith the action to read out data from the performance data memory 28 shifts from the "normal" state to the "fast" (quick advance) state.

This "fast" state lasts till the arrival of timing $t_5$ at which the note data corresponding to the next 4-th note R is read out. Upon this note data being read out, the LED 12R corresponding to the note R is lighted up in accordance therewith, and along therewith the data read-out operation returns to the "normal" state. In this case, the timing $t_5$ for lighting up the LED 12R corresponding to the note R arrives earlier than in case the data read-out operation is performed in the "normal" state. However, said timing $t_5$ takes place a 4-th note's length ahead of the timing $t_7$ at which the key for the note R is to be depressed.

Next, let us assume that the key corresponding to the note R is depressed at timing $t_6$ which is prior to the timing $t_7$ at which the key for the note R is to be depressed and also ahead of timing $t_4$ at which the key of the note Q is to be depressed. Whereupon, in accordance with this key depression, the LED 12R corresponding to the note R goes out, and along therewith the data read-out operation shifts from the "normal" state to the "fast" state. And, this "fast" state continues till the arrival of timing $t_4$, and then this state returns to the "normal" states. In this case, upon arrival, before timing $t_4$, of the time which is a 4-th note's length ahead of the timing for the depression of the key for the next note (not shown), the state of the data read-out operation returns, at said time, from the "fast" state back to the "normal" state. That is, the "fast" state continues either up to the time of starting the illumination of another LED or till the arrival of time at which a key for another note is to be depressed.

Description has been made above with respect to the operation of the device in case premature key depressions took place in succession for the notes Q and R. In case, however, the timing $t_4$ for depression of the key corresponding to the note Q has arrived without a premature depression at timing $t_3$, the device is rendered to the "wait" state in the same way as for the instance described above concerning the note P. In this case, it should be noted that, with respect to the note R, the LED 12R is lighted up at a timing which is a 4-th note's length prior to the timing $t_7$ based on the data read-out operation in the "normal" state. After this timing, LEDs 12Q and 12R corresponding to the notes Q and R are kept illuminating until a key for either one of the notes Q and R is depressed.

It should be noted here that the key depression indication in the reproduction mode is not one reflecting the key depression circumstance as mentioned above, but it is performed in such a manner as will be described below. That is, upon each arrival of time which is a 4-th note's length earlier than the actual key depressing timing for each of the notes P, Q and R, their corresponding LEDs 12P, 12Q and 12R are lighted up accordingly one after another, and upon arrival of the time for depressing LEDs go out one after another in such a manner as if the key depressions have taken place at correct timing, respectively.

Next, prior to describing various routines which make feasible the above-mentioned key depression indication as well as tone generation, explanation will be made in successive order with respect to the details of the working memory 26, and also of the data formats registered in the performance data memory 28.

Details of Working Memory 26

The working memory 26 contains those portions which function as various registers, counters, pointers, flags, etc. as will be enumerated below.

(1) First tempo counter $TCL_0$

This counter is intended to count the tempo clock signals which are generated from a tempo generator 30. If the music performance is, for example, of a quadruple time (4-beat bar), the tempo clock signal will assume a count value of 0 to 95. This counter will be reset at the timing when its count value becomes 96, i.e. at the end of a bar (measure). In case the system is in the "wait" state, the count value stays unchanged.

(2) Second tempo counter TCL

This counter is designed so that its count value is upped by one (1) for each occurrence of difference in count value from the first tempo counter $TCL_0$. In case of quadruple time, therefore, this counter assumes a count value of 0 to 95 in the same way as in case of $TCL_0$. This second tempo counter is reset at the timing when its count value becomes 96. In the "fast" state of the system, its count value is automatically upped independently of $TCL_0$, and in the "wait" state, the count value of this second tempo counter does not undergo a change as in the case of $TCL_0$.

(3) Key code register KCREG

This is an 8-bit register, and it is provided in a number same as that of the tone-producing channels (four registers in this embodiment). In each of these four registers KCREG, on/off information ("1" or "0") of LEDs are registered in the portion corresponding to the most-significant bit (MSB), and key code data read out from the performance memory 28 are written in the portion which corresponds to the lower 7 bits relative to MSB.

(4) Address pointer ADPNT

This pointer is intended to indicate a read-out address, for each note, which is stored in the performance data memory 28. This pointer is provided in a number same as that of the tone-producing channels.

(5) Time length register TLNG

In this register is written the time length data indicative of the time length between the current time indicated by the count value of the second tempo counter TCL and the key-depression timing which is indicated by that key-on timing data among the note data which is designated by the address pointer ADPN. This register TLNG is provided in a number same as that of the tone-producing channels.

(6) Channel number register CNOREG

This is intended to register the channel number data indicative of the numbers of the tone-producing channels.

(7) LED state flag LSTFLAG

This is a one-bit register, in which "1" is written in case either one of the LEDs is lighted up, whereas "0" is registered in case all LEDs are extinguished.

(8) On-time register ONTMREG

This is intended to write-in the time length data indicative of the illumination time length of LED in case an LED is lighted up and extinguished during the "wait" state of the device.

(9) Off-time register OFTMREG

This is intended to write-in the time length data indicative of the non-illumination time length of LED in case an LED is lighted up and extinguished during the "wait" state of the device.

(10) Recurrent illumination time register RONREG

This register is intended to write-in the time length data indicative of the time length from the time an LED is extinguished till same is lighted up again.

(11) State register STREG

This register is intended to write-in a state data corresponding to either the "normal", "wait" or "fast" state, in order to set the data read-out operation from the performance data memory 28 to either one of these three types of state.

(12) Run/Stop flag RSFLG

This is a one-bit register and functions so that, when the Start/Stop control swithch is turned on, "1" is written in, whereas when the switch is turned off, "0" is written in.

(13) Mode register MDREG

This register is operative so that, in order to set the operation of the electronic musical instrument to either the guide mode, reproduction mode or else, it writes-in a mode data corresponding to the mode selected in accordance with the operation of the mode changeover switch.

Figure 3:
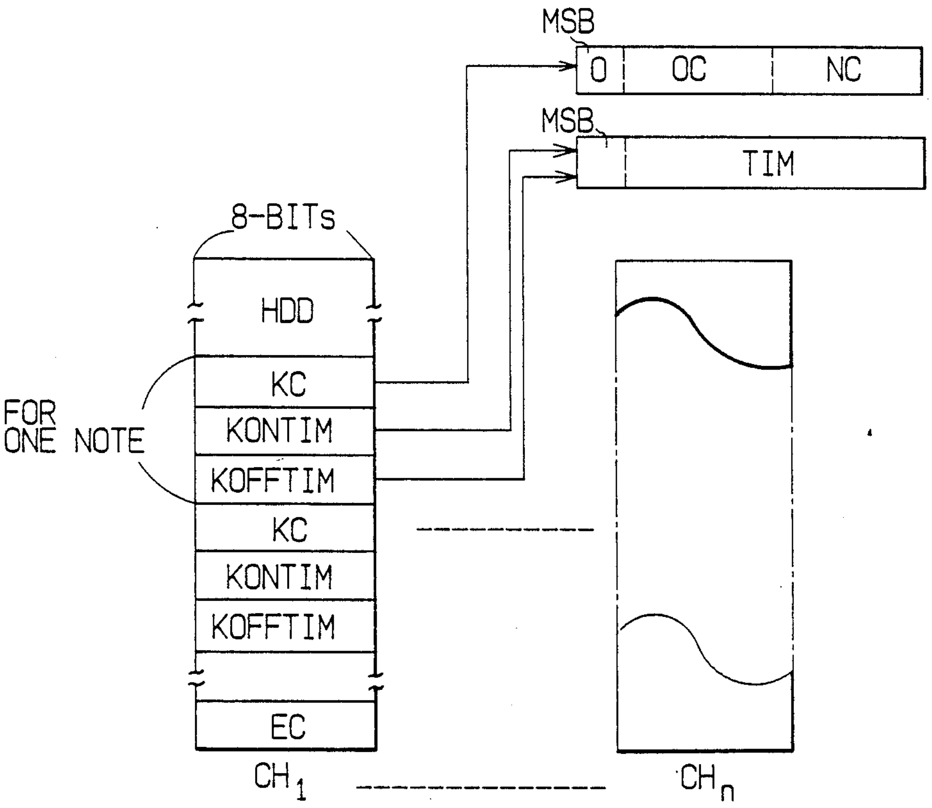
FIG. 3 is a format diagram of performance data.
Figure 4:
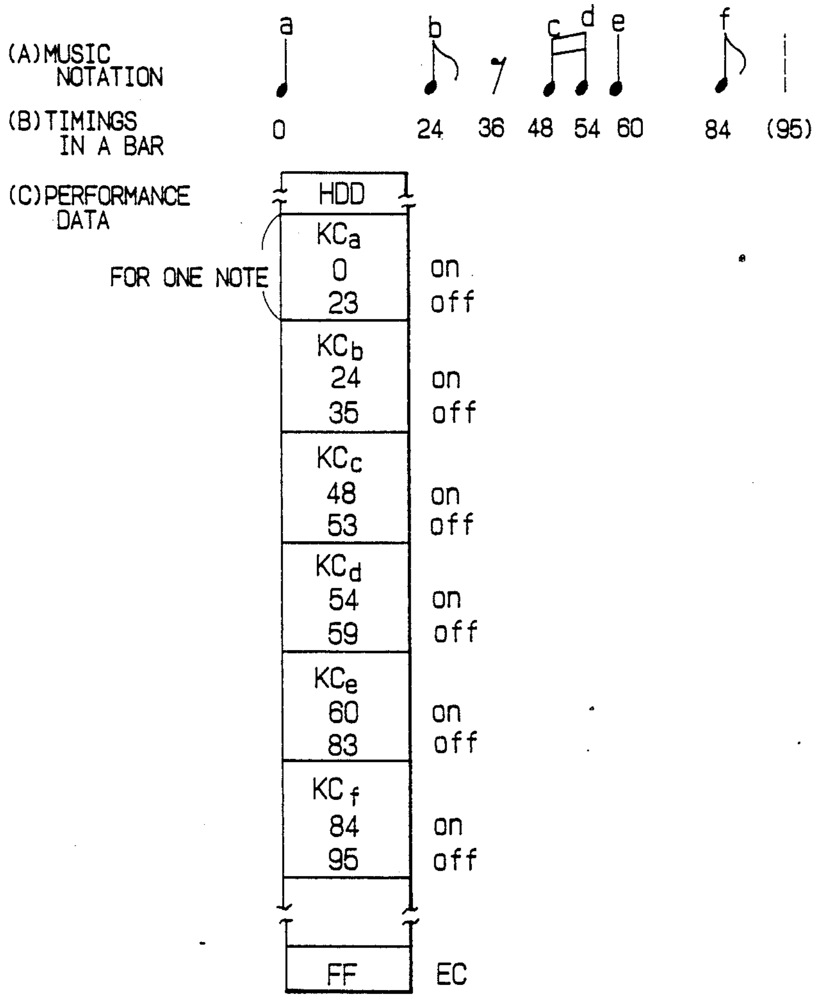
FIG. 4 is a format diagram showing an example of performance data.

Performance data format (FIGS. 3 and 4)

In the performance data memory 28 are stored performance data in such a manner that successive notes of a music piece are assigned appropriately to a plurality of tone-producing channels $CH_1$ to $CH_n$ ($n=4$ in this embodiment) as shown in FIG. 3.

The performance data for each tone-producing channel is comprised of an array of successive note data, as shown typically with respect to the tone-producing channel $CH_1$, containing a head data HDD, and on the heels thereof and for each note, a key code data KC, a key-on timing data KONTIM and a key-off timing data KOFFTIM. At the end of each of such an array, there is disposed an end-code data EC which is indicative of the end of the data. It should be understood here that each data is comprised of 8-bits (1 byte).

The head data HDD contains those data which are necessary for automatic performance, such as channel number data representing the numbers of the tone-producing channels, tempo data representing tempos, and like data.

The key-code data KC is such that its most-significant bit MSB is "0", and the next 7-bits which are less significant than MSB are comprised of octave-code data OC and note-code data NC, and they indicate tone pitch and key, respectively. Also, key-on timing data KONTIM and key-off timing data KOFFTIM are such that MSB is not in use, and the next 7-bits which are less significant than MSB are comprised of timing data TIM which is representative of either key-on timing or key-off timing. This timing data TIM takes a value 0 to 95 in case of quadruple time.

FIG. 4 shows a practical example of performance data. (A) shows an array of notes a, b, c, . . . in a musical notation; (B) shows key-on or key-off timings in a bar (this timings correspond to the count values of the above-said second tempo counter TCL); and (C) shows a performance data for one tone-producing channel. In the performance data of (C), symbols $KC_a$, $KC_b$, $KC_c$, . . . represent key-codes of the notes a, b, c, . . . respectively; and "on" and "off" indicate the key-on timing and the key-off timing, respectively. Also, a rest will be shown here exemplarily with respect to that rest which comes next to the note "b". In this case, the rest is expressed by placing, after the key-off timing "35" of the note "b" till the key-on timing "48" of the next note "c", a time difference (i.e. 13) greater than the time difference (i.e. 1) existing between respective notes which are arranged contiguously. It should be noted here that the encode data EC is comprised of data "FF" in hexadecimal notation.

Figure 5:
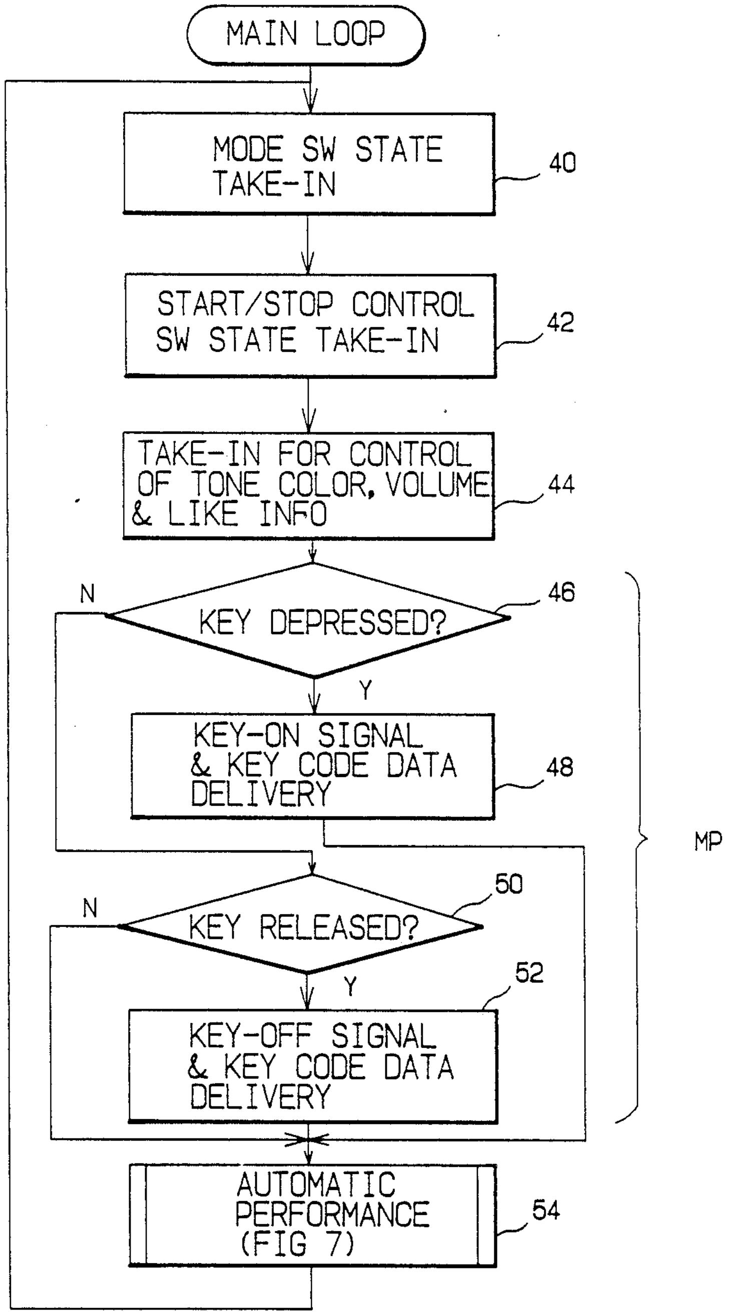
FIG. 5 is a flow chart showing the main loop processing.

Main loop (FIG. 5)

Next, description will be made of the main loop processing by giving reference to FIG. 5.

To begin with, in Step 40, an information concerning the operation of the mode-changeover switch is taken from the control switch circuit 20, and in accordance with the selective operation of said mode-changeover switch, a mode data corresponding to either the guide mode or the reproduction mode is written in the mode register MDREG.

In Step 42, an information concerning the operation of the start/stop control switch is taken from the control switch circuit 20. In case this start/stop control switch is turned on, "1" is written in the Run/Stop flag RSFLG, and when turned off, "0" is registered therein.

In Step 44, informations concerning the operation of the tone color selection switches, the tone volume setting knobs, etc. are taken from the control switch circuit 20, and in accordance with these respective informations, control is effected of tone color, tone volume and like items in the tone generating circuit 32. And, with this, processing moves over to the routine MP which is intended for the generation of manual performance tones.

In this routine MP, judgment is made, in Step 46, as to whether or not there has been effected a key depression, based on a key operation information supplied from the key switch circuit 16. If the result of this judgment if affirmative (Y), processing moves over to Step 48, wherein a key-on signal as well as a key-code data are delivered out to the tone generation circuit 32. As a result, pronunciation of a tone corresponding to the depressed key commences.

If the result of judgment made in Step 46 indicates that there is effected no key depression (N), processing moves over to Step 50, wherein judgment is made as to whether or not there is effected a key-release. If the result of the judgment is affirmative (Y), processing advances to Step 52, wherein a key-off sgnal as well as a key-code data are delivered out to the tone generating circuit 32. As a result, pronunciation of a tone corresponding to the released key ends.

If the result of judgment in Step 50 indicates that there is no key-release (N), processing moves over to Step 54. It should be noted here that also in case the processing in either Step 48 or 52 has ended, processing advances to Step 54.

Step 54 represents a sub-routine intended for an automatic performance, and its details will be described later by giving reference to FIG. 7. Upon completion of the processing in Step 54, processing returns to Step 40, and henceforth vaious kinds of processing as described above are repeated.

Figure 6:
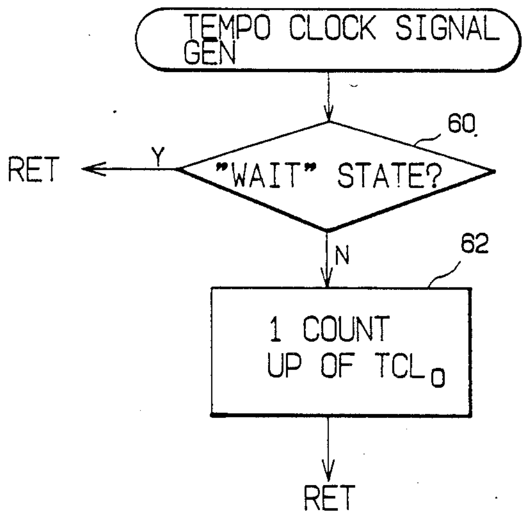
FIG. 6 is a flow chart showing the interrupt routine.

Interrupt routine (FIG. 6)

FIG. 6 shows the interrupt routine which is to be done in connection with the generation of a tempo clock signal delivered from the tempo generator 30. As described earlier, this tempo generator 30 generates a tempo clock signal at a period corresponding to a 96-th note. However, the frequency of this tempo clock signal is set in accordance with the tempo data contained in the above-said head data HDD.

Upon generation of a tempo clock signal, the state register STREG is checked in Step 60 to thereby make a judgment as to whether or not the device is in the "wait" state. If the result of this judgment is affirmative (Y), processing returns (RET) to the Main Loop of FIG. 5. If the indication is negative (N), processing moves to Step 62, wherein the count value of the first tempo counter $TCL_0$ is upped by "1", and thereafter the processing returns to the Main Loop.

In such a way as described above, the first tempo counter $TCL_0$ undergoes increment of its count value by "1" at a time for each generation of the tempo clock signal when the device is not in the "wait" state. Thus, the counter assumes a count value of 0 to 95 successively, and at the timing when "1" is added to "95", its count is cleared to "1". And, when the device is in the "wait" state, the count value of this counter undergoes no change even when a tempo clock signal is generated.

Figure 7:
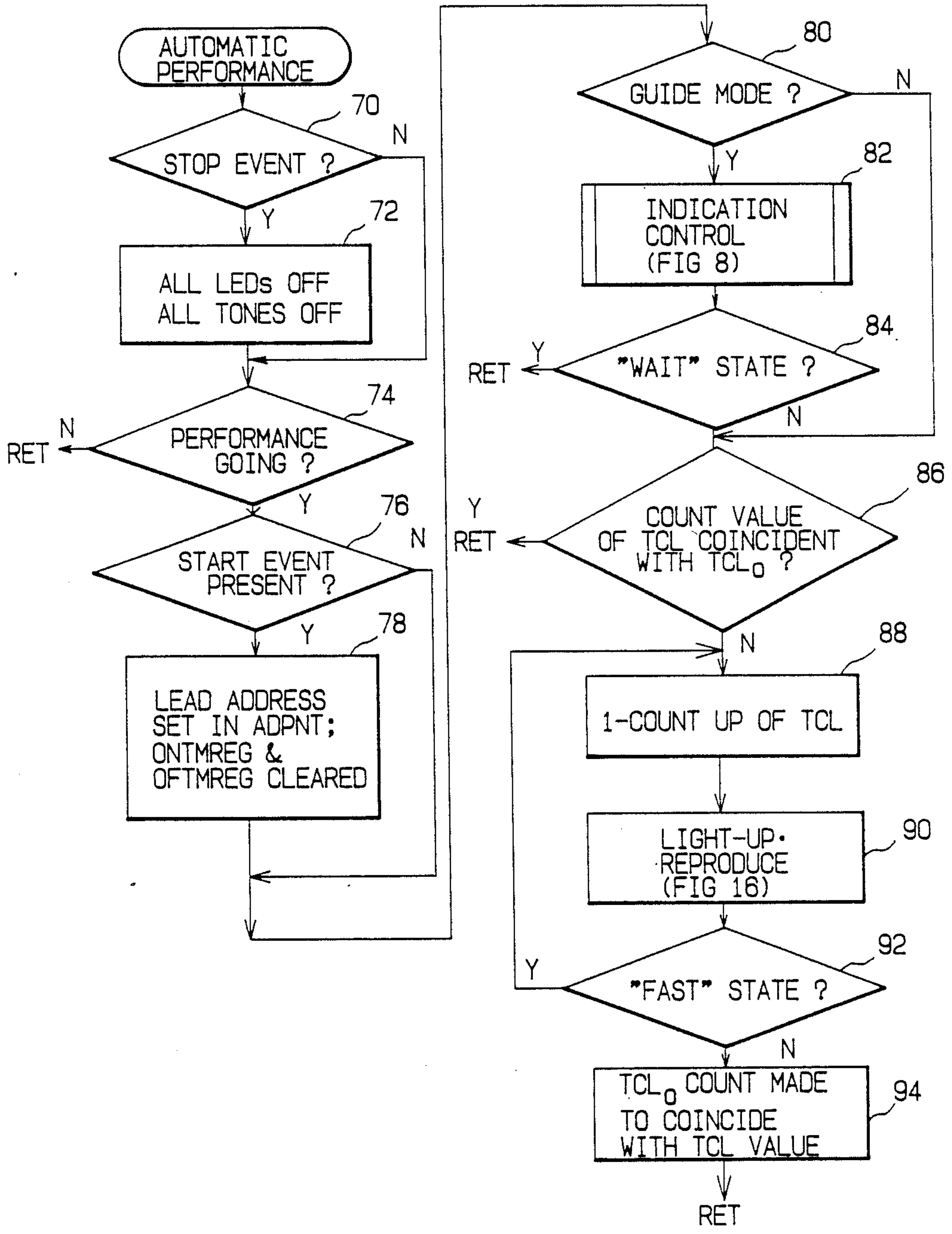
FIG. 7 is a flow chart showing the sub-routine for an automatic performance.

Automatic performance sub-routine (FIG. 7)

FIG. 7 shows the sub-routine for an automatic performance. This routine includes the processing concerning the indication of depressed keys in the guide mode, and also the processing concerning the generation of tones in an automatic performance and also concerning the indication of depressed keys in the reproduction mode.

In Step 70 to begin with, judgment is made as to whether or not there exists a stop event. The stop event is judged as "existing" (Y) either when the above-said end code data EC is detected during the course of reading out the performance data or when the change from "1" to "0" is detected from the control switch circuit 20 in accordance with the turn-off operation of the start/-stop control switch.

In case the judgment indicates that there exists a stop event, processing advances to Step 72, wherein all the illuminating LEDs in the group of LEDs 12 are put out, and along therewith all the tones which are being sounded out will cease. Thereafter, processing moves to Step 74. It should be noted here that in case the result of judgment indicates that there exists no stop event (N), processing moves directly over to Step 74 without going through Step 72.

In Step 74, checking is made as to whether or not the run/stop flag RSFLG is "1" to give a judgment whether or not a performance is under way. If the result of this judgment is negative (N), processing returns to the Main Loop of FIG. 5, and the processing of the Main Loop is repeated. That is, since in this case RSFLG assumes "0" (i.e. the start/stop control switch is rendered "off"), the device makes no operation either in the guide mode or in the reproduction mode, but the device is able to make only the generation of manual performance tones based on depressed keys on the keyboard 10.

In Step 74, in case the result of judgment indicates that the performance is under way (Y), processing moves over to Step 76, wherein whether or not there exists a start event is judged. The start event is judged to be existing (Y) upon detection of a change from "0" to "1" accruing from the turn-on operation of the start/-stop control switch.

In case the judgment indicates the exsistence of a start event, processing moves over to Step 78, wherein the top address of the performance data is set in the address pointer ADPNT for each tone-producing channel. This setting is intended to enable such a performance data as given in FIG. 3 to be read out from the very beginning thereof. Also, in Step 78, the on-time register ONTMREG and the off-time register OFTMREG which are both intnded to flash LEDs are cleared as their initial setting. Thereafter, processing moves to Step 80. In case there exists no start event (N), processing advances to Step 80 without passing through Step 78.

In Step 80, the mode register MDREG is checked to judge whether or not the registered mode is the guide mode. If the result of this judgment indicates the guide mode (Y), processing moves over to Step 82, wherein there is carried out the indication control sub-routine which will be described later in connection with FIG. 8. Thereafter, processing moves to Step 84, wherein the state register STREG is checked to judge as whether or not the device is in the "wait" state. If the result of this judgment indicates the "wait" state (Y), processing returns to the Main Loop of FIG. 5. This is because of the reason that, in case the device is in the "wait" state the guide mode, processing in Steps 86 to 94 is not necessary.

If the result of judgment in Step 84 as to "wait" state is negative (N), processing moves over to Step 86. If the result of judgment in Step 80 indicates that the device is not in the guide mode (N), this means that the device is in the reproduction mode, so that processing moves to Step 86 without going through Steps 82 and 84.

In Step 86, judgment is made as to whether the count value of the second tempo counter TCL coincides with that of the first tempo counter $TCL_0$. If the result of this judgment indicates coincidence (Y), there is no need for upping the count value of TCL, and accordingly the processing returns to the Main Loop of FIG. 5.

If the result of judgment in Step 86 indicates non-coincidence (N), processing moves over to Step 88, wherein the count value of TCL is upped by one (1). This count-up is intended to make the count value of TCL follow that of $TCL_0$.

Next, processing moves to Step 90, wherein illumination-and-reproduction sub-routine is carried out. With respect to this sub-routine, its description will be made later by referring to FIG. 16. Thereafter, in Step 92, whether or not the system is in the "fast" state is judged by checking the state register STREG. If the result of this judgment is affirmative (Y), processing in Steps 88 and 90 is repeated until STREG is set to the normal state by the processing in Step 90. This represents a quick-advance operation, and the count value of TCL shows increments independently of $TCL_0$.

When STREG is set to the normal state in the processing in Step 90, the result of judgment in Step 92 becomes negative (N), and accordingly, processing moves over to Step 94. Since the count value of TCL has become greater than that of $TCL_0$ because of the quick-advance action, the count value of $TCL_0$ is made to coincide with that of TCL in this Step 94, and thereafter, processing returns to the Main Loop of FIG. 5.

Figure 8:
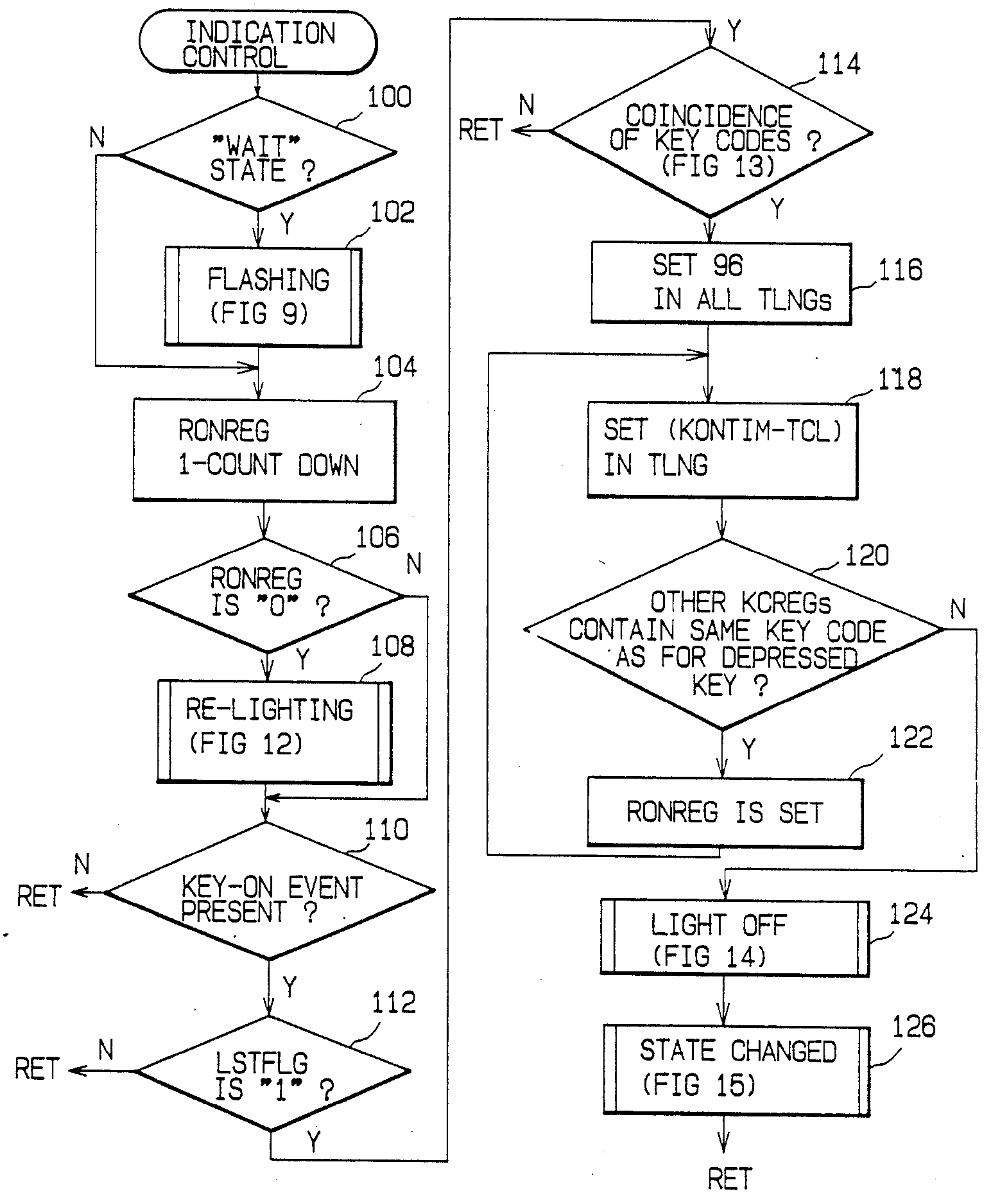
FIG. 8 is a flow chart showing the sub-routine for control of indications.

Indication control sub-routine (FIG. 8)

Next, description will be made of the indication control sub-routine by giving reference to FIG. 8.

In Step 100 to begin with, the state register STREG is checked to judge whether or not the system is in the "wait" state. If the result of this judgment is affirmative (Y), processing moves over to Step 102, which carries out such a flashing sub-routine as will be described later in connection with FIG. 9. In this flashing sub-routine, control is made for flashing action of the LED corresponding to that particular key which has not been depressed yet in spite of the arrival of its depressing time. Such a flashing of an LED bears two meanings. That is, in case one illuminating LED has turned to the flashing state, this means the arrival of the time requiring depression of the key corresponding to this flashing LED, and accordingly the the flashing LED is urging the depression of said key. Also, in case a plurality of LEDs are illuminating in parallel and one of them turns to the flashing state, this means the need to depress the key corresponding to this flashing LED in advance of any other keys corresponding to the illuminating LEDs. It should be understood here that, in this embodiment, the changing of the illumination state of LEDs to the flashing state is performed simply by switching from continuous illumination to flashing. However, such a change may be realized by altering the color of illumination.

In case the result of judgment in Step 100 is negative (N) or in case the processing in Step 102 has ended, processing moves over to Step 104. In this Step 104, numerical value "1" is subtracted from the re-illumination time register RONREG. It should be noted here that there may arise an instance that a time-length data is set in RONREG as will be described later. In case, however, no such data is written in it, this Step 104 may be considered to be equivalent to having been skipped without carrying out any processing therein.

Next, processing moves over to Step 106 to judge whether RONREG is "0". In case no data is written in RONREG as stated above, RONREG is judged as "0" (Y), so that the processing moves over to Step 108, wherein the re-illumination sub-routine is carried out. The principal processing in this re-illumination sub-routine consists of the following two jobs, one of which is to check the state of LEDs for each tone-producing channel and, if all LEDs are "off" (put out), to set "0" in the LED state flag LSTFLG, and if either one of LEDs is illuminating, to write "1" in this flag, and the other job is to light up again that specific LED which has been put out in accordance with the correctly depressed key in case data has been written in RONREG. The details thereof will be described later in connection with FIG. 12.

Description will be made also of the processing in Steps 104 and 106 in case data has been stored in RONREG.

Upon completion of Step 108, processing moves to Step 110. In this Step 110, judgment is made as to whether or not there exists a key-on event based on the key-operation information supplied from the key switch circuit 16. If the result of this judgment indicates no key event (N), there is no need to carry out the processing of Step 112 and of subsequent Steps, so that the processing returns to the sub-routine of FIG. 7.

In Step 110, if the result of judgment indicates a key event (Y), processing moves to Step 112. In this Step 112, judgment is made whether the LED state flag LSTFLG is "1" (i.e. either one of LEDs is illuminating). If the result of this judgment indicates that LSTFLG is not "1" (N), this means that all LEDs are turned off (i.e. erroneous key depression), and therefore processing returns to the sub-routine of FIG. 7. Also, if LSTFLG indicates "1" (Y), this means that either one of LEDs is illuminating, so that the processing moves to Step 114.

In Step 114, judgment is made as to whether there is a coincidence in key code between either one of the key code registers KCREG and the depressed key (i.e. whether there is a correct key depression). The details thereof will be described later by referring to FIG. 13. If the result of this judgment indicates non-coincidence (N), this means an erroneously depressed key, so that the processing returns to the sub-routine of FIG. 7. Also, in case the judgment indicates coincidence (Y), this means a correctly depressed key, so that the processing moves to Step 116, and a time length data indicative of the numerical value "96" is written in the respective time length registers TLNG. In such a case, the numerical value "96" corresponds to the length of one bar (measure). The purpose of this registration in the respective TLNG is to detect the specific LED requiring to be put out.

Next, processing moves over to Step 118, wherein the time length up to the time requiring the depression of a key is calculated and written in the specific TLNG corresponding to that tone-producing channel for the key which has been depressed correctly. That is, the key-on timing data KONTIM among the note data which is indicated by an address pointer ADPNT corresponding to that tone-producing channel for the correctly depressed key is read out, and the time length data corresponding to the length of time obtained by subtracting the current time indicated by the second tempo counter TCL from the time indicated by said read-out data for depressing a key (this subtracted result is shown conveniently as "KONTIM-TCL" in the drawing) is stored in TLNG corresponding to that tone-producing channel for the key correctly depressed. In such a case, the time length data which is stored in TLNG indicates "0" in case a key is depressed correctly at the time at which this key is to be depressed, and in case the key is depressed earlier than the time at which this key is to be depressed, the data indicates the numerical value corresponding to the difference in time therebetween. It should be noted here that, in case of the "wait" state, the second tempo counter TCL ceases counting, so that the count value of TCL will never goes beyond the time for the depression of the intended key.

Upon completion of the processing in Step 118, the processing moves to Step 120. In this Step 120, judgment is made whether or not there exists, in other key code registers KCREG, a same key code as that for the depressed key. This is a necessary processing in view of the possible instance wherein note data of a same tone pitch which are to be sounded out seccessively could have been assigned to different tone-producing channels. If the result of this judgment indicates the presence of a same key code (Y), processing moves over to Step 122, wherein a time length data indicative of an appropriate period of time (non-illumination period) till re-illumination is written in the re-illumination time register RONREG. With this, the processing returns to Step 118, wherein, in such a manner as that described above with respect to one tone-producing channel, Steps 118 and 120 are repeated for other tone-producing channels which contain a same key code. As a result, a time length data "KONTIM-TCL" is stored in TLNG corresponding to each tone-producing channel containing the same key code. As a result of the processing which goes through Step 122 once or a plurality of times, the result of judgment in Step 120 will become negative (N).

Regardless of whether the processing has or has not gone through Step 122, if the result of the judgment in Step 120 indicates the presence of no identical key code (N), processing moves over to Step 124. This Step 124 works in such a way that, from all of the time length registers TLNG, the minimum time length among the stored time lengths is detected and the illuminating LED for the tone-producing channel corresponding to the detected minimum time length is put out, and the details of this operation will be described later by referring to FIG. 14.

Thereafter, processing advances to Step 126 to carry out the state-changing sub-routine. This routine is to judge whether or not there is the need to alter the current state either to the normal state or to the "fast" state, and to write an appropriate state data in the state register STREG. The details of this Step will be described later by referring to FIG. 15. And, upon completion of Step 126, processing returns to the sub-routine of FIG. 7.

Now, in case note data of a same tone pitch which are to be sounded out in succession are assigned to different tone-producing channels, a time length data corresponding to a predetermined non-illumination period is written in the re-illumination time register RONREG in Step 122, and thereafter in Step 124 the LED corresponding to the correctly depressed key is put out. When, thereafter, the sub-routine of FIG. 8 is started, numerical value "1" is subtracted from the time length data contained in RONREG in Step 104. With this, processing moves to Step 106 to make judgment as to whether the data value in this RONREG is "0". If it is not "0", processing in Step 110 and of subsequent Steps is carried out in the same way as has been described above. If a data value greater than "1" has been stored in RONREG, the end of the non-illumination period arrives during several repetitions of the routine of FIG. 8. As a result, the judgment of Step 106 becomes affirmative (Y), and in accordance therewith, processing moves over to Step 108. In this Step 108, the LED which has been priorly put out in compliance with the correctly depressed key is re-illuminated. The details thereof will be described later by referring to FIG. 12.

Figure 9:
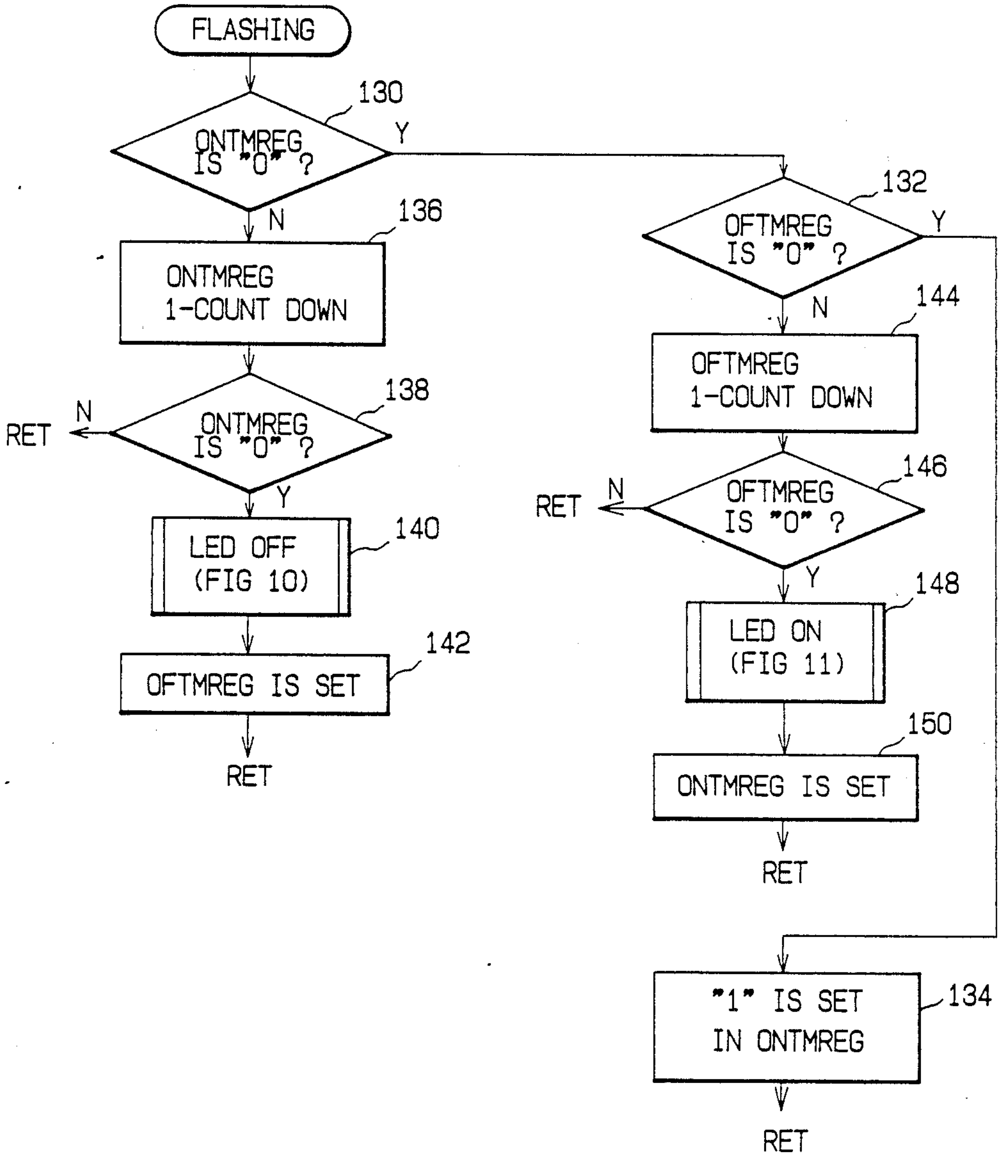
FIG. 9 is a flow chart showing the sub-routine for causing flashing illuminations of the indicators.

Flashing light sub-routine (FIG. 9)

Next, description will be made of flashing action of LEDs by giving reference to FIG. 9.

In Step 130 to begin with, judgment is made whether or not the on-time register ONTMREG is "0". Immediately after being rendered to the "wait" state, ONTMREG is rendered to "0", so that the result of the judgment becomes affirmative (Y), and processing moves to Step 132.

In Step 132, judgment is made whether or not the off-time register OFTMREG is "0". Immediately after the system has been rendered to the "wait" state, OFTMREG indicates "0", so that the result of judgment becomes affirmative (Y), and processing moves over to Step 134.

In Step 134, numerical value "1" is written in ONTMREG. With this, the processing returns to the sub-routine of FIG. 8.

When, thereafter, the processing moves to the sub-routine of FIG. 9 again, the result of judgment in Step 130 becomes negative (N) since "1" has been already written in ONTMREG, so that the processing moves over to Step 136.

In Step 136, numerical value "1" is subtracted from ONTMREG. With this, the processing moves to Step 138, wherein judgment is made whether or not ONTMREG is "0". Since, in this case, ONTMREG has become "0" due to the subtraction of "1" therefrom, the result of judgment becomes affirmative (Y), and processing moves to Step 140.

In Step 140, the LED corresponding to that particular key which has arrived at its depressing time is, turned off (put out). The details thereof will be described later by giving reference to FIG. 10.

Thereafter, the processing moves to Step 142, wherein the non-illumination time length is written in OFTMREG. With this, processing returns to the sub-routine of FIG. 8.

When processing moves to the sub-routine of FIG. 9 again, the result of judgment in Step 130 becomes affirmative (Y), and processing moves to Step 132. Since the non-illumination time length has been written in OFTMREG in Step 142, the result of judgment in Step 132 becomes negative (N), and processing moves to Step 144.

In Step 144, numerial value "1" is subtracted from OFTMREG. And, processing moves to Step 146 to make a judgment whether or not OFTMREG is "0". Normally, the judgment of not "0" (N) is made, so that processing returns to the sub-routine of FIG. 8. Thereafter, OFTMREG becomes "0" after passing through Step 144 several times, so that the result of judgment in Step 146 becomes affirmative, and processing moves over to Step 148.

In Step 148, the LED which has till then been put out in Step 140 is lighted up. With respect to this processing, its description will be made later by giving reference to FIG. 11. Thereafter, processing moves to Step 150 wherein the illumination time length is written in ONTMREG. And, processing returns to the sub-routine of FIG. 8.

When, thereafter, processing moves to the sub-routine of FIG. 9, the result of judgment in Step 130 will become negative (N) since an illumination time length has been written in ONTMREG in Step 150, and with this the processing moves to Step 136. In this Step 136, numerical value "1" is subtracted from ONTMREG. And, processing moves to Step 138, wherein judgment is made as to whether ONTMREG is "0". Normally, the result of this judgment is not "0" (N), so that the processing returns to the sub-routine of FIG. 8. When, thereafter, the processing passes through Step 136 several times, ONTMREG becomes "0", so that, in accordance with this, the result of judgment in Step 138 becomes affirmative (Y). With this, the processing moves to Step 140. In this Step 140, the LED which has been priorly lighted up in Step 148 is put out, and thereafter, via Step 142, the processing returns to the sub-routine of FIG. 8.

In such a way as mentioned above, LEDs are on/off-controlled for each predetermined time interval, whereby making it possible to cause flashing action of that particular LED corresponding to the key which has arrived at the timing for its depression.

Figure 10:
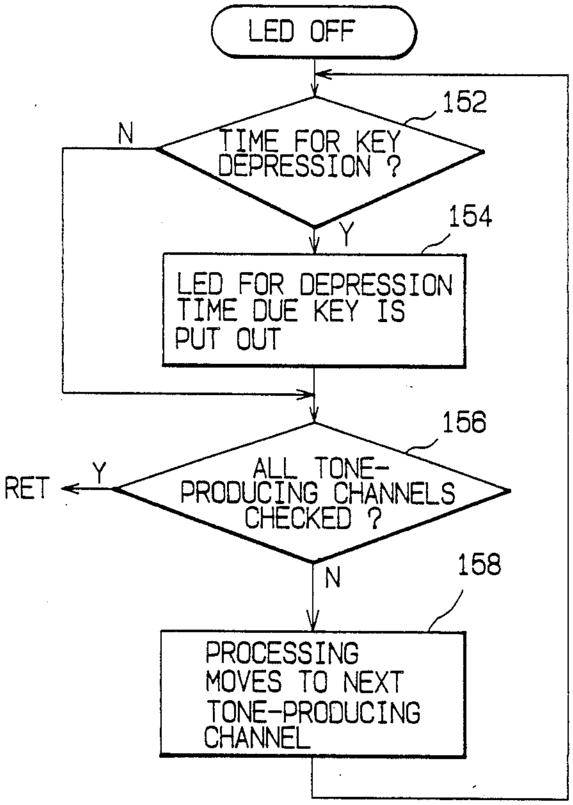
FIG. 10 is a flow chart showing the sub-routine for turning off LEDs.
Figure 11:
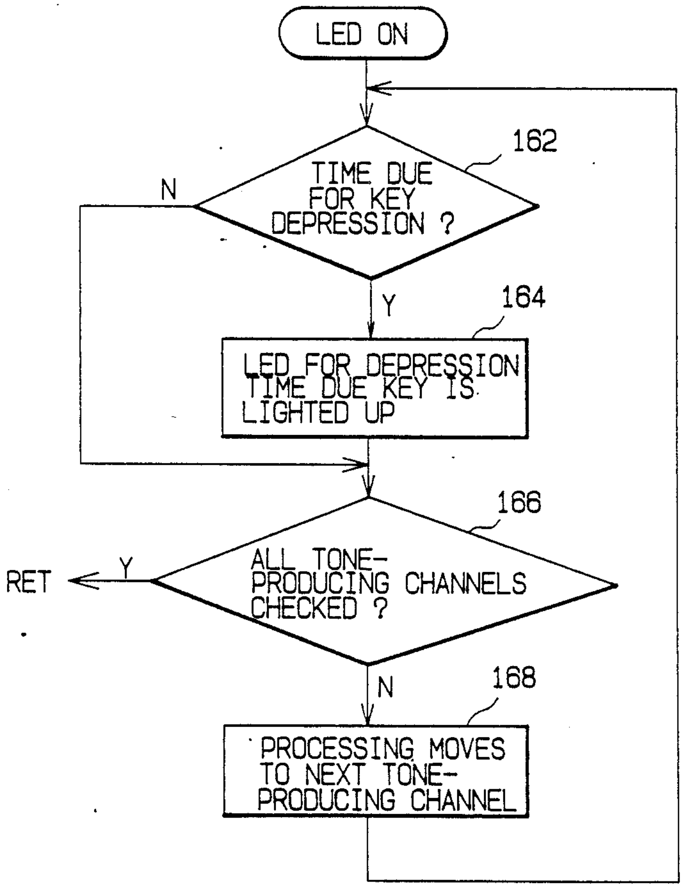
FIG. 11 is a flow chart showing the sub-routine for turning on LEDs.

LED-on & LED-off sub-routine (FIGS. 10 and 11)

Next, description will be made of the LED-off sub-routine by referring to FIG. 10.

In Step 152 to begin with, judgment is made whether or not the time for depressing a key has arrived. This is carried out by reading out that key-on timing data KONTIM indicated by the address pointer ADPNT among the note data and corresponding to a certain tone-producing channel, and by checking whether there is coincidence between the time for a key depression which is indicated by this read-out data and the current time indicated by the second tempo counter TCL. If the result of this judgment is affirmative (Y), processing moves to Step 154 to put out that specific LED corresponding to the particular key which has arrived at its depressing time. In this case, the key which has arrived at its depressing time is specified by that key code data contained in the key code register KCREG corresponding to the same tone-producing channel as that for reading out the above-said key-on timing data KONTIM.

In case the result of judgment in Step 152 is negative (N), or in case the processing in Step 154 ends, processing moves to Step 156. In this Step 156, judgment is made as to whether or not the check in Step 152 for all tone-producing channels has ended. If not yet ended (N), processing moves to the next tone-producing channel via Step 158.

With respect also to said next tone-producing channel, the judgment in Step 152 is made in the same way as for the instance described above, and the processing in Step 154 is carried out as required. Check is made of the respective tone-producing channels one after another. Upon completion of check of all the channels, the result of judgment in Step 156 becomes affirmative (Y), and the processing returns to the sub-routine of FIG. 9.

FIG. 11 shows the LED-on sub-routine. This sub-routine differs from the above-mentioned LED-off sub-routine of FIG. 10 only in that aspect that the "off" of LED is replaced by "on". More particularly, in FIG. 11, Steps 162, 164, 166 and 168 correspond to Steps 152, 154, 156 and 158 in FIG. 10, respectively, so that by applying the description concerning FIG. 10, the instant sub-routine will be understood easily. Therefore, its detailed explanation is omitted here.

Figure 12:
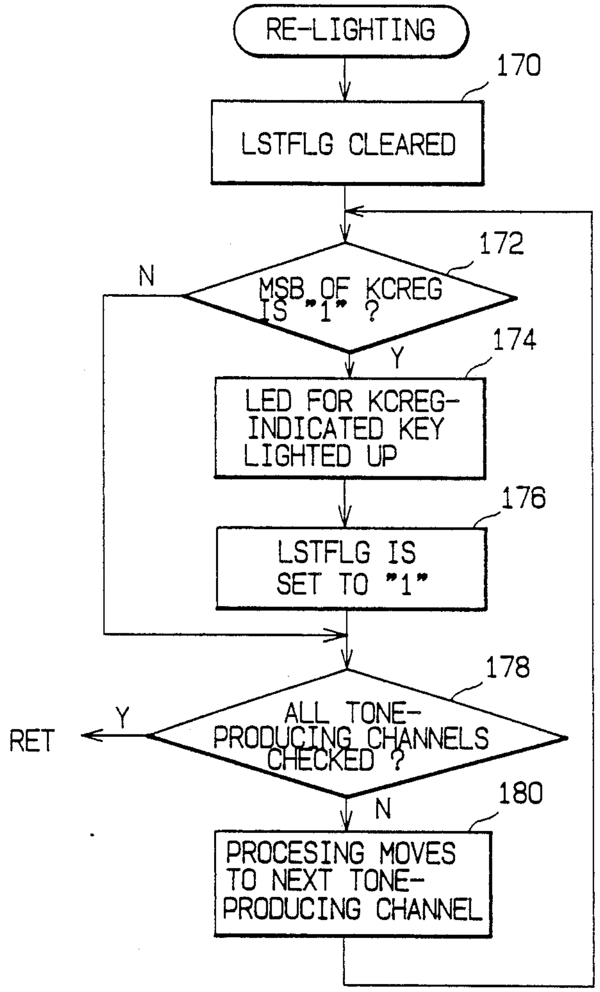
FIG. 12 is a flow chart showing the sub-routine for relighting on of indicators.

Re-illumination sub-routine (FIG. 12)

Next, description will be made of the re-illumination of LEDs by giving reference to FIG. 12.

In Step 170 to begin with, the LED state flag LSTFLG is cleared. And, processing moves to Step 172, wherein judgment is made as to whether or not the key code register KCREG corresponding to a given tone-producing channel is "1". If the result of this judgment indicates "1" (Y), this means the existence of an illuminating LED or the existence of an LED which requires to be lighted up, so that the processing moves to Step 174.

In Step 174, the specific LED corresponding to the key indicated by KCREG is lighted up. And, the processing moves to Step 176, wherein numerical Value "1" is written in LSTFLG.

In case the result of judgment in Step 172 is negative (N), or in case the processing in Step 176 ends, processing moves over to Step 178. In this Step 178, judgment is made as to whether the check made in Step 172 has ended for all the tone-producing channels. If not ended yet (N), processing moves over to the step of checking the next tone-producing channel via Step 180.

With respect also to said next tone-producing channel, judgment in Step 172 is performed in the same way as that described above, and processing in Steps 174 and 176 is carried out as required. By checking the tone-producing channels one after another in this way, and when the check of all tone-producing channels has ended, the result of judjment in Step 178 becomes affirmative (Y), so that the processing returns to the sub-routine of FIG. 8.

In the above-described re-illumination sub-routine, the lighting-up of an LED in Step 174 is not necessary for the currently illuminating LED. However, as stated already, in case the non-illumination period which has been written in the re-illumination time register RONREG has ended and in case the processing thus has moved to the sub-routine of FIG. 12, said processing in Step 174 is necessary for re-iliiminating the LED which has been put out once.

More particularly, when in Step 172, a judgment is made at the end of the non-illumination period as to whether the MSB of KCREG is "1" with respect to a tone-producing channel which is different from that tone-producing channel for the correctly depressed key, the result of this judgment becomes affirmative, so that the processing moves to Step 174. In this Step 174, the LED which is the same as that which was put out in accordance with the priorly correctly depressed key, is lighted up again. For example, in FIG. 2, let us here assume that notes Q and R are assigned to mutually different tone-producing channels, respectively, and also that these two notes have a same tone pitch G. Then, the LED 12Q corresponding to the tote pitch G will be lighted up at timing $t_2$ corresponding to the note Q.

And, with respect to the note R also, it will be noted that, at timing $t_5$, this is the time at which the LED 12Q is to be lighted up. If, however, this LED 12Q is still illuminating, its lighting-up gives the user no distinction from the indication of the note Q. Let us now assume that a correct key depression is made for the note Q at a timing later than the timing $t_5$. The LED 12Q will be put out accordingly. When, following the start of this putting-out action, the above-said illumination period ends, the LED 12Q is lighted up again in correspondence to the note R.

As described above, by arranging so that an LED is lighted up again at the end of the lapse of a certain period of time following its extinction, there will arise no confusion with respect to the indication of the key to be depressed, between the prceding and succeeding notes having a same tone pitch, and thus an exact indication of re-depression of a key can be realized.

Figure 13:
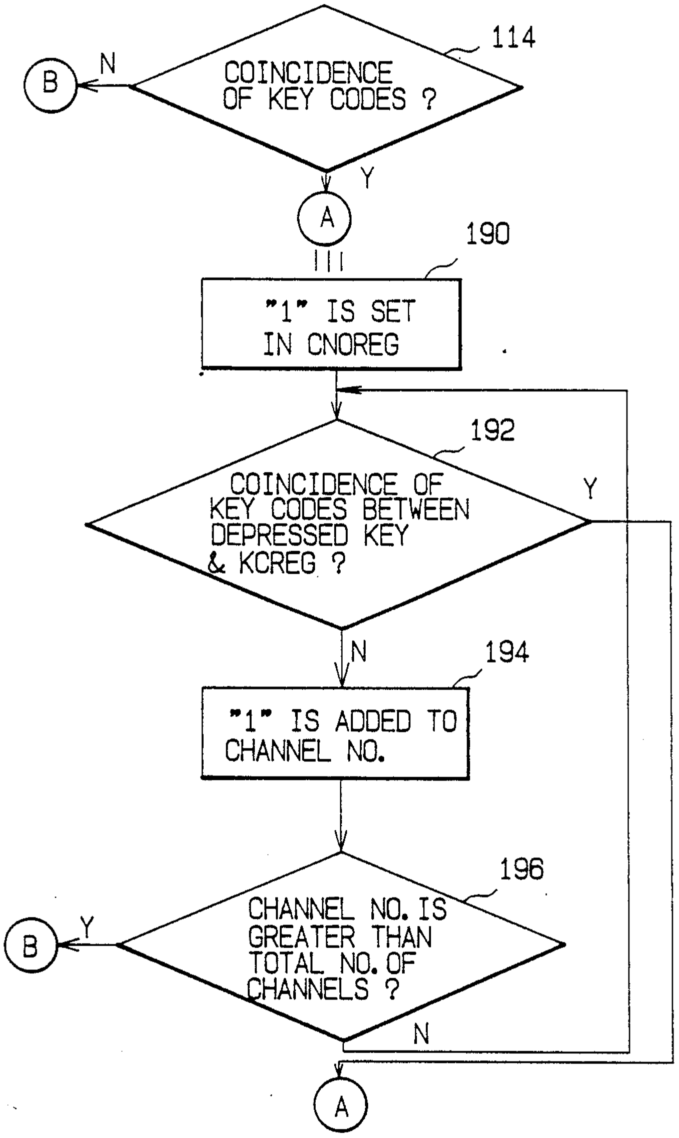
FIG. 13 is a flow chart showing the process taken upon judgment as to coincidence of key codes between the key indicated and the key depressed.

Processing of judgment concerning coincidence between key codes (FIG. 13)

Next, description will be made of the processing of judgment concerning coincidence or non-coincidence between key codes (Step 114) by referring to FIG. 13.

In Step 190 to begin with, a channel number "1" is written in the channel number register CNOREG. And, processing moves over to Step 192, wherein judgment is made as to whether or not there is a coincidence of key codes between KCREG corresponding to the channel number written in CNOREG and the depressed key. If the result of judgment indicates a coincidence (Y), processing moves to Step 116 Ⓐ.

In Step 192, in case the result of judgment indicates a non-coincidence (N), processing moves to Step 194 wherein numerical value "1" is added to the channel number contained in CNOREG. And, processing moves to Step 196, wherein judgment is made whether the channel number is of a greater numerical value than the total number of the channels (which, in this example, is four). Normally, it is not greater (N), so that the processing returns to the Step 192, and carries out Steps 192 and 194. During the course of several repetitions of Steps 192 abd 194 in this way, when the result of judgment in Step 192 becomes affirmative (Y), processing moves over to Step 116 of FIG. 8. In case, however, the result of judgment in Step 192 for all tone-producing channels is negative (N), the result of judgment in Step 196 will become affirmative (Y), and processing returns to the sub-routine of FIG. 8 Ⓑ. This means that, after checking all tone-producing channels, no coincident key code is found, whereby signifying that there was an erroneous key depressin.

Figure 14:
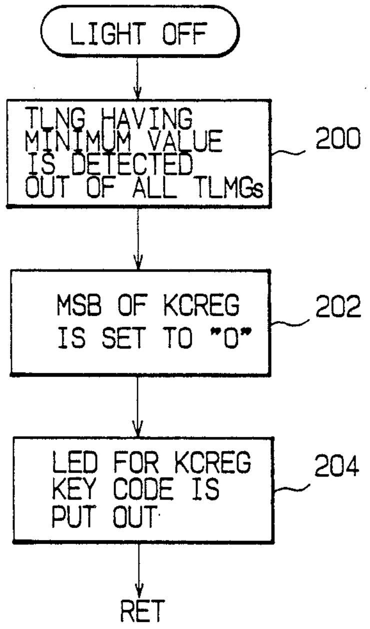
FIG. 14 is a flow chart showing the sub-routine for putting out illuminations.

Light extinction sub-routine (FIG. 14)

Next, description will be made of the LED extinction sub-routine by referring to FIG. 14.

In Step 200 to begin with, among all the time length registers TLNG, detection is made of the one containing the smallest time length data. And, processing moves over to Step 202 to render to "0" the MSB of the key code register KCREG for the same tone-producing channel as for the TLNG which stores the detected minimum time length. Thereafter, the processing moves to Step 204 to extinct the LED corresponding to the key code of that KCREG which has rendered the MSB to "0", and thereafter the processing moves back to the sub-routine of FIG. 8.

According to such a series of processing as mentioned above, it should be noted that, in case a key is correctly depressed during the illumination of an LED, this latter LED is put out. Also, in case a plurality of LEDs are illuminating in parallel fashin, if only one key is depressed correctly, only that LED corresponding to this correctly depressed key is put out, and also in case all of a plurality of keys are depressed correctly, those LEDs corresponding to these plurality of correctly depressed keys will be put out one after another each time the processing moves to the routine of FIG. 14 (it should be noted that these LEDs are observed to extinguish simultaneously when viewed externally). In case, however, mutually different time lengths are written in a plurality of TLNG, respectively, in Steps 118 and 112 of FIG. 8, the processing in Step 200 detects the TLNG storing the shortest time length data, thus putting out the LED corresponding to the key which is to be depressed at the earliest timinge than the other keys. This LED is again lighted up in a manner as stated above.

Figure 15:
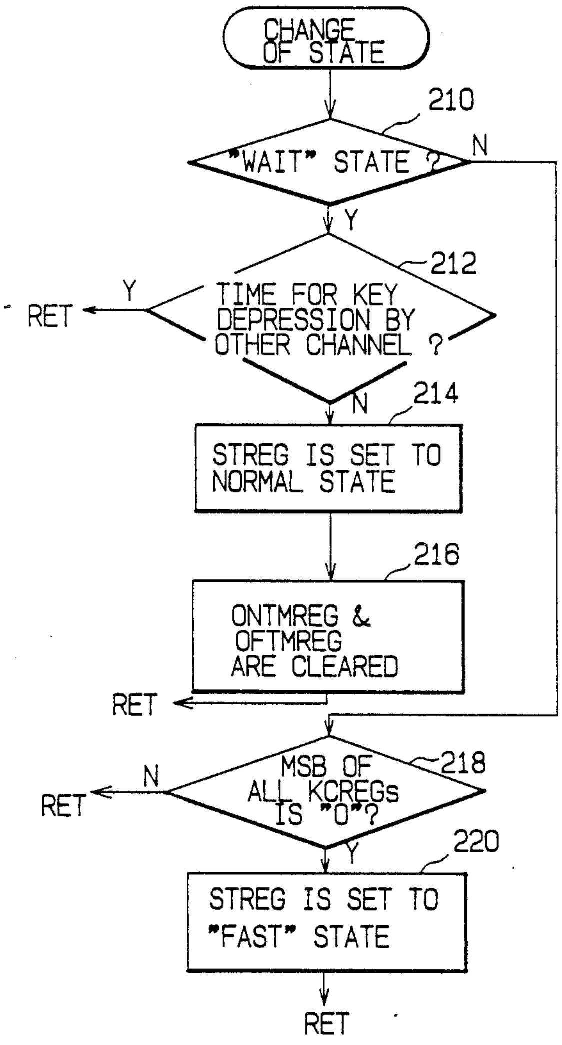
FIG. 15 is a flow chart showing the sub-routine for changing the state.

State changing sub-routine (FIG. 15)

Next, description will be made of the state changing sub-routine by referring to FIG. 15.

In Step 210 to begin with, whether "wait" state of not is judged by checking the state register STREG. If the result of the judgment indicates the "wait" state (Y), processing moves to Step 212, wherein judgment is made whether now is the time for a key depression for any other tone-producing channel. This judgment can be accomplished by carrying out, with respect to the other tone-producing channel, the processing similar to that described already in connection with Step 152 of FIG. 10. In case the result of this judgment is affirmative (Y), i.e for example, when only one key is correctly depressed with respect to a chord, there is the need to continue the "wait" state with respect to a key different from the depressed key, so that the processing returns to the sub-routine of FIG. 8.

In case the result of judgment in Step 212 is negative (N), processing moves over to Step 214, wherein the state register STREG is set to the normal state. This is because there has been a correct key depression in the "wait" state and further because there is no need to continue the "wait" state with respect to the other keys, so that the "wait" state has been released.

Next, processing moves to Step 216, wherein the on-time register ONTMREG and the off-time register OFTMREG are cleared. This is a processing following the release of the "wait" state, and also serves concurrently as a prparatory processing for carrying out the flashing sub-routine of FIG. 9 again.

On the other hand, in case the judgment in Step 210 indicates that the system is not in the "wait" state, processing moves to Step 218. This means that a correct key depression has taken place prior to being rendered to the "wait" state, i.e. earlier than the time for key depression.

In Step 218, judgment is made whether MSB of all key code registers KCREG is "0" (i.e. whether LEDs corresponding to all tone-producing channels are extinguished). If the result of judgment indicates that it is not "0" (N), processing returns to the sub-routine of FIG. 8. If it is judged to be "0" (Y), processing moves to Step 220 and renders STREG to the "fast" state, and thereafter the processing returns to the sub-routine of FIG. 8. Accordingly, even when there takes place an early correct key depression, if either one of LEDs is illuminating, the system is not rendered to the "fast" state, and it is only when all LEDs are extinct that the system is rendered to the "fast" state.

Figure 16:
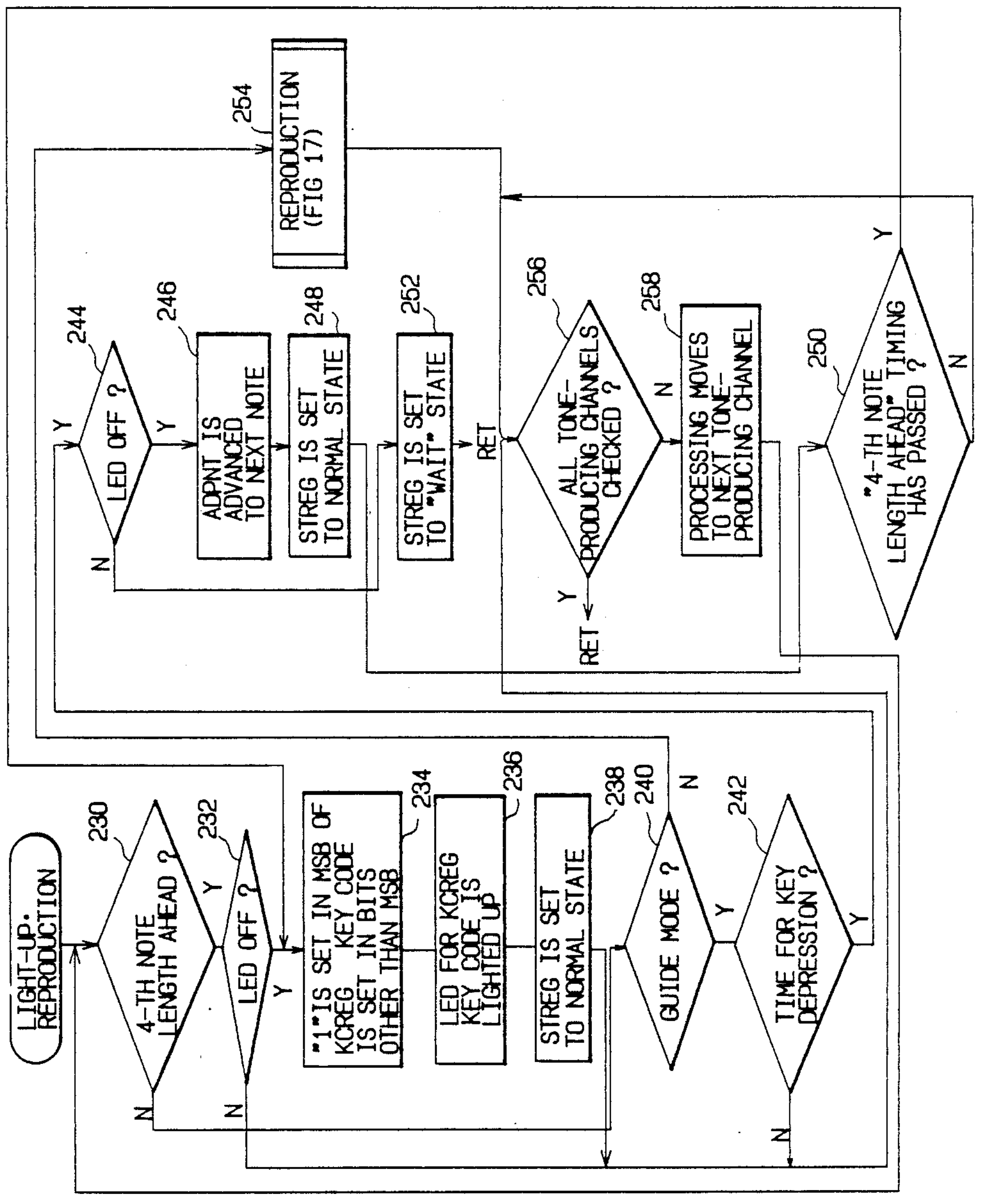
FIG. 16 is a flow chart showing the sub-routine for lighting up indications and reproducing automatic performance.

Illumination and reproduction sub-routine (FIG. 16)

Next, description will be made of the illumination and reproduction sub-routine by referring to FIG. 16.

In Step 230 to begin with, judgment is made whether or not the timing which is ahead of the timing for the correct key depression by a 4-th note's duration has arrived. This is carried out by reading out from among the note data a key-on timing data KONTIM indicated by the address pointer ADPNT corresponding to a given tone-producing channel, and by checking whether there is a coincidence between the time obtained by sutracting "24" (corresponding to the 4-th note's length) from the key depressing timing indicated by the read-out key-on timing data and the current time indicated by the second tempo counter TCL. If the result of this judgment is affirmative (Y), processing moves to Step 232.

In Step 232, whether MSB of the key code register KDREG is "0" is checked to judge whether the LED is put out. If the result of this judgment is affirmative (Y), processing moves to Step 234. In this Step 234, "1" is written in the MSB of KCREG, and along therewith a key code is written in other bits than MSB. And, processing moves to Step 236, wherein the LED corresponding to the key code stored in KDREG is lighted up. Thereafter, in Step 238, the state register STREG is rendered to the normal state.

On the other hand, in case the result of judgment in Step 230 has truned out to be negative (N), processing moves to Step 240. In this Step 240, the mode register MDREG is checked to judge whether the guide mode is indicated. If the result of this judgment is affirmative, processing moves to Step 242, wherein now is the time for depressing a key. This is carried out in the same way as that described already in connection with Step 152 (FIG. 10), i.e. by checking whether there is a coincidence between the key depressing timing indicated by the key-on timing data KONTIM and the current time indicated by the second tempo counter TCL.

If the result of judgment in Step 242 indicates that it is now a key depressing timing (Y), processing moves over to Step 242 wherein judgment is made whether the LEDs are put out in such a manner similar to that described in connection with Step 232. If the result of judgment is affirmative (Y), ths means the accomplishment of a correct key depression, so that processing moves to Step 246, wherein the address pointed ADPNT is advanced to the read-out address for the next note. And, processing moves to Step 248 to render STREG to the normal state, and processing moves to Step 250.

Step 250 is necessary because of the possibility that note data of different tone pitches which are to be sounded out in succession could have been assigned to a same tone-producing channel. And, this Step 250 is designed to read out that specific key-on timing data KONTIM, from among the note data, which is indicated by the address pointer ADPNT and which has been written in by the processing in Step 246, and to judge whether the time obtained by subtracting "24" from the key-depressing timing indicated by the read-out data is smaller than the current time, i.e. whether the current time has already passed the timing of a 4-th note's length before key depression. If the result of this judgment is affirmative (Y), this means that time has passed the timing for lighting up an LED (a 4-th note's length ahead) for the note next to the note of which the corresponding key was depressed correctly before the arrival of the key depressing timing, so that Steps 234 and 236 are carried out to light up said LED, and thereafter Step 238 is carried out. The reason why, as stated above, the LED corresponding to a secceeding note is lighted up under the condition that a correct key depression was effected prior to the arrival of the key-depressing timing with respect to the preceding note is: even when said LED is lighted up at the arrival of the illuminating time, there could happen that, owing to the limited number of the tone-producing channels, the depression of the key corresponding to said LED does not lead to the pronunciation of a sound, and therefore it is not desirable to indicate the depression of a key when pronunciation of s sound for the depressed key is not available.

If, in the judgment of Step 244, the result thereof indicates that the LED is not extinguished (N), this means that a correct key depression has not been effected yet at the arrival of the key-depressing timing, so that the processing moves to Step 252, wherein the STREG is rendered to the "wait" state. And, the processing returns to the sub-routine of FIG. 7. When, thereafter, the sub-routine of FIG. 8 is carried out, the LED corresponding to the key awaiting its depression is controlled of its flashing action in Step 102.

If the result of judgment in Step 240 indicates that the system is not in the guide mode (N), this means the reproduction mode, so that the processing moves to Step 254, wherein the reproduction sub-routine is carried out. This reproduction sub-routine is to effect indication of key depression corresponding to an automatic performance and the contents thereof. The details thereof will be described later in connection with FIG. 17.

In the above-mentioned processing, (a) in case the result of judgment in Step 232 is negative (N), (b) in case the processing in Step 238 ends, (c) in case the result of judgment in Step 242 is negative (N), (d) in case the result of judgment in Step 250 is negative (N) or in case the processing in Step 254 ends, the processing moves to Step 256. In this Step 256, judgment is made as to whether the check in Step 230 has ended for all the tone-producing channels, and if the result thereof indicates "not ended yet" (N), processing moves to the next tone-producing channel via Step 258, and the processing in Step 230 and in subsequent Steps is carried out in the same way as that described above. Upon completion of the checking of all the tone-producing channels in this way, the result of judgment in Step 256 becomes affirmative (Y), and the processing returns to the sub-routine of FIG. 7.

According to the routine of FIG. 16, processing is carried out for each tone-producing channel. Therefore, lighting-up of LEDs in Step 236, setting of address pointer in Step 246, registering of the "wait" state in Step 252, indication of key depression and tone generation in Step 254, and so on are all possible to proceed in parallel for a plurality of tone-producing channels.

Figure 17:
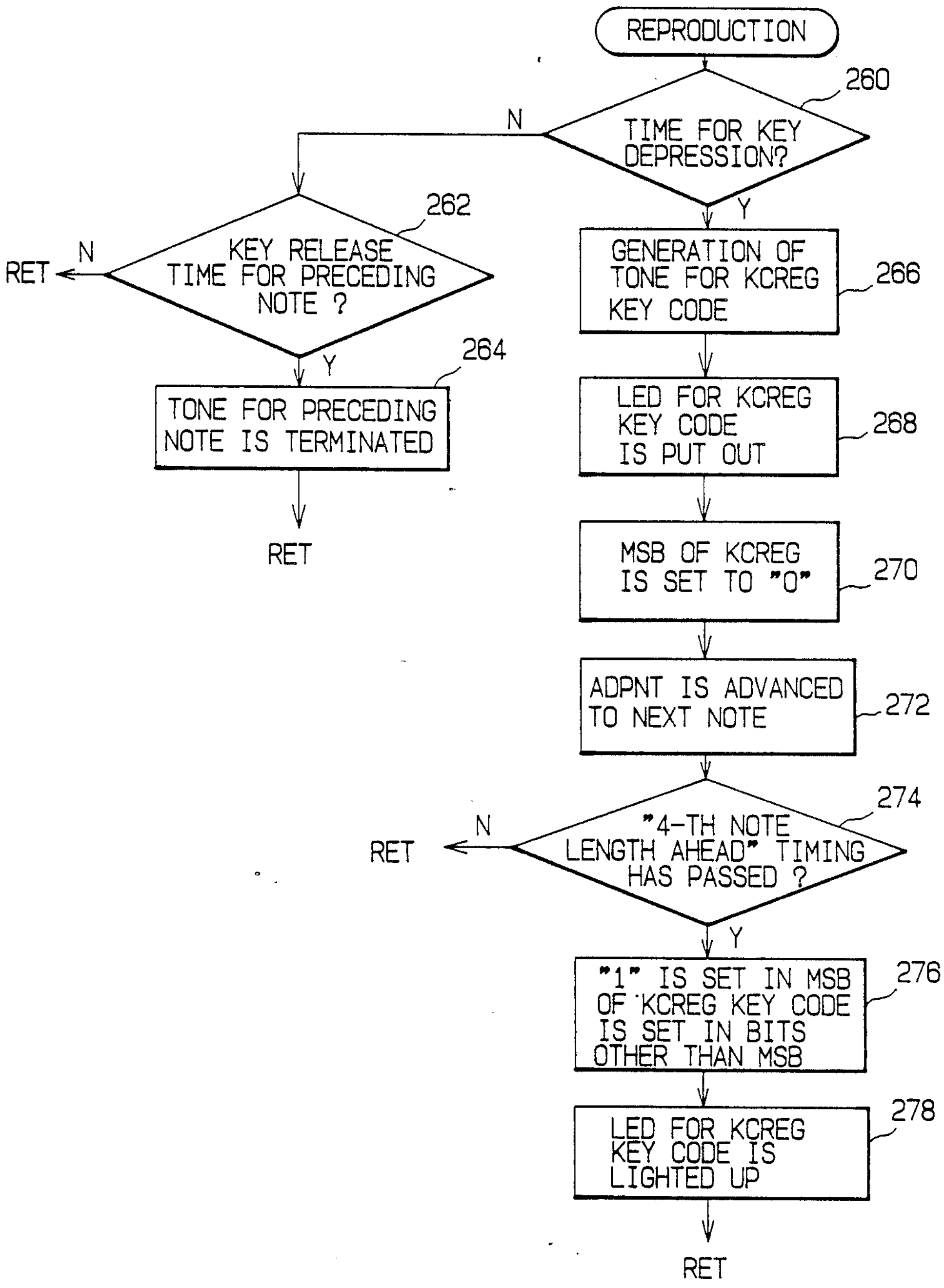
FIG. 17 is a flow chart showing the sub-routine for reproducing automatic performance.

Reproduction sub-routine (FIG. 17)

Next, description will be made of the reproduction sub-routine by referring to FIG. 17.

In Step 260 to begin with, judgment is made as to whether it is timing for a key depression in the same way as that described above. If the result of this judgment is negative (N), processing moves to Step 262, wherein judgment judgment is made as to whether the preceding note has arrived at the key-release timing for this note. This processing is carried out by reading out the key-off timing data KOFFTIM of the preceding note and by checking whether the key-depressing timing indicated by this read-out data coincides with the current time indicated by the second tempo counter TCL. If the result of this judgment is negative (N), processing returns to the sub-routine of FIG. 16.

If the result of judgment in Step 262 indicates that it is time for releasing the key (Y), processing proceeds to Step 264. In this Step 264, the tone generating circuit 32 (FIG. 1) is controlled to terminate the tone corresponding to the preceding note. And, the processing returns to the sub-routine of FIG. 16.

On the other hand, if the result of judgment in Step 260 indicates that it is time for a key depression (Y), processing moves to Step 266. In this Step, the tone generating circuit 32 is controlled based on the key code contained in the key code register KDREG to thereby generate a tone corresponding to said key code.

Next, processing moves to Step 268, wherein the LED corresponding to the key code of KCREG is put out. This LED is the one which was turned on a 4-th note's length time ahead of its key-depressing timing by the processing of FIG. 16 in Steps 230 to 236. The extinction of this LED in Step 268 provides for a result same as if a correct key depression took place. Following such an extinction of illumination, MSB of KCREG is rendered to "0" in Step 270, and thereafter the processing moves to Step 272.

In Step 272, the address pointer ADPNT is advanced to the read-out address of the next note. And, processing moves to Step 274, wherein judgment is made whether the time has passed the timing of a 4-th note's length before with respect to the note indicated by ADPNT in the same way as in the above-described Step 250 (FIG. 16). If not passed yet (N), processing returns to the sub-routine of FIG. 16.

In Step 274, if the result of judgment indicates that the 4th-note-length-ahead timing has passed (Y), processing moves to Step 276. In this Step 276, "1" is written in the MSB of KCREG, and along therewith the key code of the next note is written in the other bits than MSB. And, processing moves to Step 278, wherein the LED corresponding to said key code of KCREG is lighted up. Thereafter, the processing moves back to the sub-routine of FIG. 16.

The above-described Steps 274, 276 and 278 are similar to the Steps 250, 234 and ,236 which have been described in connection with FIG. 16, and they are effective and useful in case note data of mutually different tone pitches which are to be sounded out in succession are assigned to a same tone-producing channel.

In the above-described embodiment, arrangement is made so that a plurality of tone-producing channels are used in either one of the guide mode and the reproduction mode. It should be understood here, however, that arrangement may be provided so that two groups of tone producing channels are provided so as to use one of these groups for the guide mode of a certain part (e.g. melody part) and the other group for the reproduction mode of another part (e.g. accompaniment part). By so arranging, it becomes possible to obtain such an operation that, when a certain part is played on the keyboard in accordance with the key-depressing indications, the user is able to perform key depression while listening to the automatic performance of said other part, so that the efficiency of exercise improves.

As stated above, according to the present invention, arrangement is provided so that note data corresponding to a plurality of notes which are to be sounded out successively are stored in a memory means as they are assigned to a plurality of tone-producing channels; that, for each tone-producing channel, detection is made, based on the tempo clock signal, of the arrival at a certain time ahead of the depressing timing of the key for the note assigned to each tone-producing channel; that the note data corresponding to such a note is read out from said memory means; and that, based on the read-out note data, the indicating member corresponding to the tone pitch of this note is illuminated. Thus, a sufficient key depression indicating period is available for each note. Accordingly, there is the advantage such that, even in case a plural number of short notes come in succession on a music piece, the user of the instrument is able to depress those keys with no difficulty.

Also, according to the present invention, in case of a succession of a plurality of short notes, a plurality of indicating members corresponding respectively to these notes are lighted up in parallel fashion. This is made feasible because the lighting-up of an indicating member is not effected in the prior art fashion in which a correct key depression of the preceding note is the condition for lighting the succeeding note key, but instead in the present invention, the arrival at a certain length of time ahead of the key depressing timing for each tone-producing channel is the condition for lighting the succeeding note key. Let us here suppose that, when a plurality of indicating members are illuminating in parallel fashion as stated above, a key corresponding to a succeeding note is depressed earlier than the key for the preceding note by a mistake of the key depressing order. Even in such a case, this key depression is handled as being a correct one. Then, by depressing a key corresponding to the preceding note, the key depressing indication proceeds without interruption. In contrast thereto, in the prior art, unless the preceding note undergoes a correct key depression, the indication of key depression for the succedding note is not commenced, so that in case of, for example, succession of a plurality of short notes, the progress of key depressing indication is frequently interrupted. According to the present invention, however, such an interruption of progression of indication can be avoided, and thus there is the advantage that an efficient exercise is feasible.

Furthermore, by arranging the system of the present invention in a more actual configuration, there can be obtained such advantages as enumerated in (1) through (5) below, depending on the contents of respective actual applications.

(1) Means may be provided for detecting the fact of a key depression for the illuminating indicator, and if the result of the detection indicates the fact of a key depression, the corresponding indicator is extinguished, and if the result indicates no key depression, the manner of illumination will be altered to thereby control the state of illumination. By so arranging, it becomes possible to easily recognize the key requiring to be depressed next, in such a case when a plurality of indicators are illuminating in parallel fashion, thus making a smooth progression of performace available.

(2) Arrangement is provided so that, in case a key is not depressed in spite of the arrival of the key depressing timing, the illuminating indicator will alter its manner of illumination from that it has been presenting till then, and along therewith the generation of tempo clock signals is ceased and the system is rendered to the "wait" state, whereby making it possible to prevent uncontrolled proceed of the key depressing indication in case keys are depressed at a slow pace.

(3) Arrangement may be made so that, in case a key is depressed before the arrival of the key-depressing timing, the note data read-out timing is quickened under the condition that all the indicators are put out. Whereby, in case of a quick pace of key depression, it becomes possible to effect key depressing indications in good concert with such a quick pace. This, jointly with the slow pace of key depression described in (2) above, is useful in making the key depressing exercise in level with the acquired degree of skill. It should be noted here that the above-said quickening of the read-out timing is intended to prevent an excessive advancement of key depressing indication by arranging the quickening to be limited either up to the timing at which a note data is read out (i.e. start of illumination) for a tone-producing channel different from that one for which a key depression took place, or up to the arrival of the key depressing timing relating to a tone-producing channel different from the one for which there was a key depression.

(4) Arrangement may be provided so that in case a note data of a same tone pitch are read out in succession for mutually different tone-producing channels as shown in the embodiment, one indicator corresponding to said tone pitch is lighted up to correspond to the preceding note and thereafter, under the condition that there was a key depression for the preceding note, the indicator is put out for a certain period of time, and then it is lighted up again for the succeeding note, whereby making it possible to avoid confusion in key depressing indication between the preceding note and the succeeding note.

(5) Arrangement may be provided so that, in case note data of mutually different tone pitches which are to be sounded out in succession are assigned to a same tone-producing channel, the indicator corresponding to the succeeding note is lighted up under the condition that there was a key depression ahead of the key depressing timing for the preceding note, whereby making it possible to eliminate the inconvenience that a key depressing indication is given when the pronunciation of a sound is not possible to the succeeding note.

What is claimed is:

1. A key depression indicating device for an electronic musical instrument having a plurality of tone-producing channels for producing musical tones responsive to the depression of keys on a plural key keyboard of said instrument, each of said keys corresponding to a particular tone generated by the tone-producing channels, the key depression indicating device comprising:

(a) a plurality of indicators provided corresponding respectively to the plural keys of said keyboard;

(b) memory means for storing note data representing a plurality of notes required to be sounded out in succession to constitute a music performance;

(c) means for generating a tempo clock signal representative of a preselected tempo;

(d) progression means for providing information representative of progression of notes of said musical performance over time in accordance with said preselected tempo, thereby designating a timing at which the keys corresponding to the notes of the musical performance should be depressed;

(e) reading-out means for reading out, from said memory means and in response to the information provided by the progression means, the note data for each note a common predetermined length of time ahead of the designated time at which the key corresponding to the note should be depressed according to the preselected tempo of the musical performance; and (f) illumination control means for illuminating, each time the note data for a note is read out from said memory means, an indicator corresponding to the key of the note represented by the read-out note data.

2. A key depression indicating device for an electronic musical instrument having a plurality of tone-producing channels for producing musical tones responsive to the depression of keys on a plural key keyboard of said instrument, each of said keys corresponding to particular tone generated by the tone-producing channels, the key depression indicating device comprising:

(a) a plurality of indicators provided corresponding respectively to the plural keys of said keyboard;

(b) memory means for storing note data representing a plurality of notes required to be sounded out in succession to constitute a music performance;

(c) means for generating a tempo clock signal representative of a preselected tempo;

(d) progression means for providing information representative of progression of notes of said musical performance over time in accordance with said preselected tempo, thereby designating a timing at which the keys corresponding to the notes of the musical performance should be depressed;

(e) reading-out means for reading out, from said memory means and in response to the information provided by the progression means, the note data for each note a common predetermined length of time ahead of the designated time at which the key corresponding to the note should be depressed according to the preselected tempo of the musical performance;

(f) illumination control means for illuminating, each time the note data for a note is read out from said memory means, an indicator corresponding to the key of the note represented by the read-out note data;

(g) detecting means for detecting, from among said plurality of keys whether a key is depressed; and (h) indication control means for controlling the illumination of the indicator corresponding to the depressed key when the detecting means detects that the key is depressed.

3. A key depression indicating device according to claim 2, in which:

said indication control means extinguishes the illumination of the indicator corresponding to a key upon detection of the depression of the key by said detecting means.

4. A key depression indicating device according to claim 2, in which:

said indicators have a first illuminated state and a second illuminated state, and said indication control means alters the state of illumination of the an indicator from the first illuminated state to the second illuminated state when said detecting means detects that the key corresponding to the indicator has not been depressed within the time the key should have been depressed.

5. A key depression indicating device for an electronic musical instrument having a plurality of tone-producing channels for producing musical tone responsive to the depression of keys on a plural key keyboard of said instrument, each of said keys correspoding to a particular tone generated by the tone-producing channels, the key depression indicating device comprising:

(a) a plurality of indicators provided corresponding respectively to the plural keys of said keyboard, each of said indicators having a first illuminated state and a second illuminated state;

(b) memory means for storiag note data representing a plurality of notes required to be sounded out in succession to constitute a music performance;

(c) means for generating a tempo clock signal representative of preselected tempo;

(d) progression means for providing information representative of the progression of notes of said musical performance over time in accordance with said preselected tempo, thereby designating a timing at which the keys corresponding to the notes of the musical performance should be depressed;

(e) reading-out means for reading out from said memory means and in response to the information provided by the progression means the note data for each note a common predetermined length of time ahead of the designated time at which the key corresponding to the note should be depressed according to the preselected tempo of the musical performance;

(f) illumination control means for illuminating, each time the note data for a note is read out from said memory means, an indicator corresponding to the key of the note represented by the read-out note data;

(g) detecting means for detecting, from among said plurality of keys whether a key correspondnig to an illuminated indicator is depressed;

(h) illumination extinguishing means for extinguishing the illumination of an illuminating indicator when the detecting means detects that the key corresponding to the illuminating indicator is depressed;

(i) time detecting means for detecting when the time has elapsed for each of the keys to be depressed according to the timing designated by the read out note data; and (j) control means for interrupting the generation of the tempo clock signal and altering the state of illumination of the indicator of a key when the key remains undepressed after the time has elapsed for the key to be depressed, as determined by the time detecting means.

6. A key depression indicating device for an electronic musical instrument having a plurality of tone-producing channels for producing musical tones responsive to the depression of keys on a plural key keyboard of said instrument, each of said keys corresponding to a particular tone generated by the tone producing channels, the key depression indicating device comprising:

(a) a plurality of indicators provided corresponding respectively to the plural keys of said keyboard;

(b) memory means for storing note data representing a plurality of note required to be sounded out in succession to constitute a music performance;

(c) means for generating a tempo clock signal representative of a preselected tempo;

(d) progression means for providing information representative of the progression of notes of said musical perfomrance over time in accordance with said preselected tempo, thereby designating a timing at which the keys corresponding to the notes of the musical performance should be depressed;

(e) reading-out means for reading out, from said memory means and in response to the information provided by the progression means, the note data for each note at the pace of the tempo clock signal a predetermined common length of time ahead of the designated time at which the key corresponding to the note should be depressed according to the preselected tempo of the musical performance;

(f) illumination control means for illuminating, each time the note data for a note is read out from said memory means, an indicator corresponding to the key of the note represented by the read-out note data;

(g) detecting means for detectig, from among said plurality of keys, whether a key is depressed;

(h) illumination extinguishing means for extinguishing the illumination of an illuminating indicator when the detecting means detects that the key corresponding to the illuminating indicator is depressed;

(i) time detecting means for detecting when the time has elapsed for each of the keys to be depressed according to the timing designated by the read out note data; and (j) reading-out timing control means operative to quicken the pace that the reading-out means reads out the note data when the detecting means detects that a key has been depressed prior to the common predetermined length of time ahead of the time at which the key should have been depressed according to the preselected tempo of the musical performance.

7. A key depression indicating device according to claim 6 in which:

said reading-out timing control means is operative to return, when said reading-out means reads out a next note data at a quickened pace, this quickened pace back to the pace determined by said tempo clock signal.

8. A key depression indicating device according to claim 6, in which:

said reading-out timing control means is operative to return, at an arrival of a next key-depressing timing, said quickened pace back to the pace determined by said tempo clock signal.

9. A key depression indicating device for an electronic musical instrument having a keyboard with a plurality of depressable keys corresponding respectively to a plurality of musical notes, comprising:

a plurality of indicators which respectively correspond to said plurality of depressable keys of the keyboard, each of the indicators having at least a first and second state of indication;

a memory for storing a data representative of note signals corresponding respectively to a sequential distribution of musical notes of a musical performance;

read-out means for reading out the data for each note from the memory at a preselected tempo at which the musical performance is desired to be performed; and activation means for changing the plurality of indicators from the second to the first state of indication at a preselected common period of time prior to the time at which the keys corresponding to the indicators should be depressed in order to perform the musical performance according to the preselected tempo.

* * * * *